United States Patent
Wu et al.

(10) Patent No.: US 6,907,070 B2
(45) Date of Patent: Jun. 14, 2005

(54) DRIFTING REDUCTION AND MACROBLOCK-BASED CONTROL IN PROGRESSIVE FINE GRANULARITY SCALABLE VIDEO CODING

(75) Inventors: Feng Wu, Beijing (CN); Shipeng Li, Irvine, CA (US); Ya-Qin Zhang, West Windsor, NJ (US); Bing Zeng, Beijing (CN); Xiaoyan Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 10/007,074

(22) Filed: Nov. 8, 2001

(65) Prior Publication Data

US 2002/0150158 A1 Oct. 17, 2002

Related U.S. Application Data

(60) Provisional application No. 60/255,982, filed on Dec. 15, 2000.

(51) Int. Cl.$^7$ ............................ H04N 7/12; H04N 11/02
(52) U.S. Cl. ................................................. 375/240.12
(58) Field of Search ................................. 348/409, 413, 348/412, 416, 385, 387; 375/240.1, 240.16, 240.12, 240.11, 240.25, 240.03, 240.01, 240.18, 240.27

(56) References Cited

U.S. PATENT DOCUMENTS

| | | | | |
|---|---|---|---|---|
| 6,130,911 A | * | 10/2000 | Lei | 375/240.16 |
| 6,173,013 B1 | * | 1/2001 | Suzuki et al. | 375/240.16 |
| 6,275,531 B1 | * | 8/2001 | Li | 375/240.12 |
| 6,292,512 B1 | * | 9/2001 | Radha et al. | 375/240.1 |
| 6,614,936 B1 | * | 9/2003 | Wu et al. | 382/238 |
| 6,697,426 B1 | * | 2/2004 | Van Der Schaar et al. | 375/240.01 |

* cited by examiner

*Primary Examiner*—Chris Kelley
*Assistant Examiner*—Behrooz Senfi
(74) *Attorney, Agent, or Firm*—Lee & Hayes, PLLC

(57) ABSTRACT

A motion-compensated video encoding scheme employs progressive fine-granularity layered coding to encode macroblocks of video data into frames having multiple layers, including a base layer of comparatively low quality video and multiple enhancement layers of increasingly higher quality video. Some of the enhancement layers in a current frame are predicted from different quality layers in reference frames. The video encoding scheme estimates drifting errors during the encoding and chooses a coding mode for each macroblock in the enhancement layer to maximize high coding efficiency while minimizing drifting errors.

53 Claims, 16 Drawing Sheets

Fig. 17
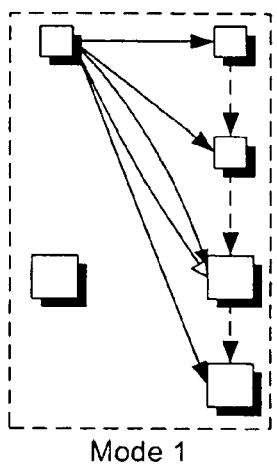
Mode 1
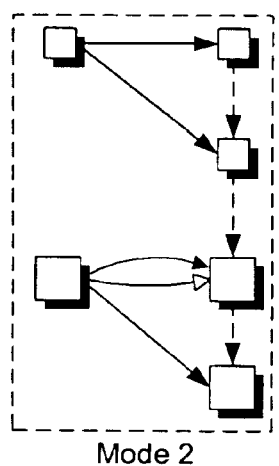
Mode 2
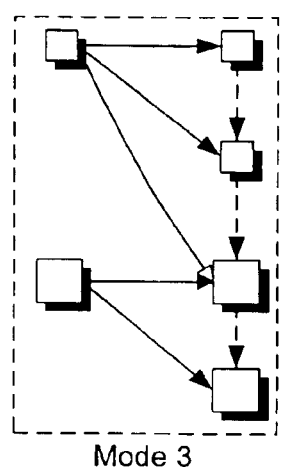
Mode 3
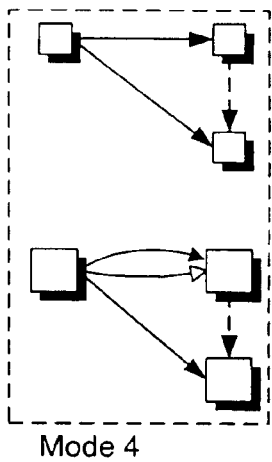
Mode 4
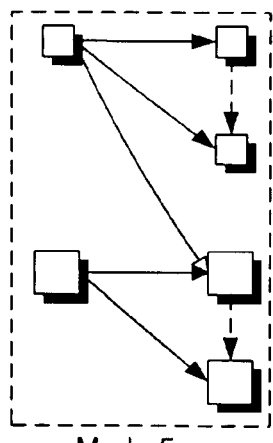
Mode 5
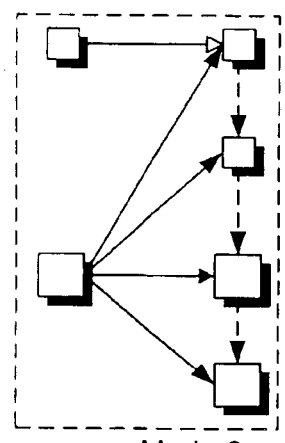
Mode 6
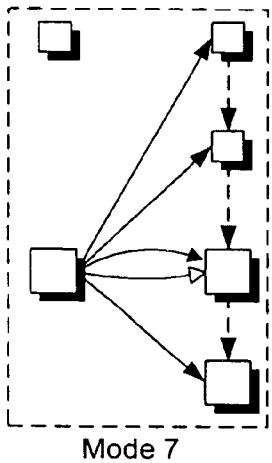
Mode 7

DRIFTING REDUCTION AND MACROBLOCK-BASED CONTROL IN PROGRESSIVE FINE GRANULARITY SCALABLE VIDEO CODING

RELATED APPLICATIONS

This U.S. patent application claims priority to U.S. Provisional Patent Application Ser. No. 60/255,982, titled "Drifting Reduction And Macroblock-Based Control In Progressive Fine Granularity Scalable Video Coding", filed on Dec. 15, 2000, which is incorporated herein by reference. This U.S. patent application is related to the following U.S. patent applications, each of which is incorporated herein by reference: U.S. patent application Ser. No. 09/454,489, titled "System and Method for Robust Video Coding Using Progressive Fine-Granularity Scalable (PFGS) Coding", filed on Dec. 3, 1999; and U.S. patent application Ser. No. 09/505,254, titled "System and Method with Advance Predicted Bit-Plane Coding for Progressive Fine-Granularity Scalable (PFGS) Video Coding", filed on Feb. 15, 2000.

TECHNICAL FIELD

This invention relates to systems and methods for coding video data, and more particularly, to motion-compensation-based fine-granularity layered video coding schemes that reduce drifting errors, as well as improve coding efficiency.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print. Unfortunately, video data is significantly larger than other data types commonly delivered over the Internet. As an example, one second of uncompressed video data may consume one or more Megabytes of data. Delivering such large amounts of data over error-prone networks, such as the Internet and wireless networks, presents difficult challenges in terms of both efficiency and reliability.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263.

One particular type of motion-compensation-based video coding scheme is fine-granularity layered coding. Layered coding is a family of signal representation techniques in which the source information is partitioned into sets called "layers". The layers are organized so that the lowest, or "base layer", contains the minimum information for intelligibility. The other layers, called "enhancement layers", contain additional information that incrementally improves the overall quality of the video. With layered coding, lower layers of video data are often used to predict one or more higher layers of video data.

The quality at which digital video data can be served over a network varies widely depending upon many factors, including the coding process and transmission bandwidth. Quality of Service", or simply "QoS", is the moniker used to generally describe the various quality levels at which video can be delivered. Layered video coding schemes offer a range of QoSs that enable applications to adopt to different video qualities. For example, applications designed to handle video data sent over the Internet (e.g., multi-party video conferencing) must adapt quickly to continuously changing data rates inherent in routing data over many heterogeneous sub-networks that form the Internet. The QoS of video at each receiver must be dynamically adapted to whatever the current available bandwidth happens to be. Layered video coding is an efficient approach to this problem because it encodes a single representation of the video source to several layers that can be decoded and presented at a range of quality levels.

Apart from coding efficiency, another concern for layered coding techniques is reliability. In layered coding schemes, a hierarchical dependence exists for each of the layers. A higher layer can typically be decoded only when all of the data for lower layers or the same layer in the previous prediction frame is present. If information at a layer is missing, any data for the same or higher layers is useless. In network applications, this dependency makes the layered encoding schemes very intolerant of packet loss, especially at the lower layers. If the loss rate is high in layered streams, the video quality at the receiver is very poor.

FIG. 1 depicts a conventional layered coding scheme 20, known as "fine-granularity scalable" or "FGS". Three frames are shown, including a first or intraframe 22 followed by two predicted frames 24 and 26 that are predicted from the intraframe 22 and the previous frame 24. The frames are encoded into four layers: a base layer 28, a first layer 30, a second layer 32, and a third layer 34. The base layer typically contains the video data that, when played, is minimally acceptable to a viewer. Each additional layer contains incrementally more components of the video data to enhance the base layer. The quality of video thereby improves with each additional layer. This technique is described in more detail in an article by Weiping Li, entitled "Fine Granularity Scalability Using Bit-Plane Coding of DCT Coefficients", ISO/IEC JTC1/SC29/WG11, MPEG98/M4204 (December 1998).

With layered coding, the various layers can be sent over the network as separate sub-streams, where the quality level of the video increases as each sub-stream is received and decoded. The base-layer video 28 is transmitted in a well-controlled channel to minimize error or packet-loss. In other words, the base layer is encoded to fit in the minimum channel bandwidth. The goal is to deliver and decode at least the base layer 28 to provide minimal quality video. The enhancement layers 30–34 are delivered and decoded as network conditions allow to improve the video quality (e.g., display size, resolution, frame rate, etc.). In addition, a decoder can be configured to choose and decode a particular portion or subset of these layers to get a particular quality according to its preference and capability.

One characteristic of the illustrated FGS coding scheme is that the enhancement layers 30–34 are predicatively coded from the base layer 28 in the reference frames. As shown in FIG. 1, each of the enhancement layers 30–34 in the predicted frames 24 and 26 can be predicted from the base layer of the preceding frame. In this example, the enhancement layers of predicted frame 24 can be predicted from the base layer of intraframe 22. Similarly, the enhancement layers of predicted frame 26 can be predicted from the base layer of preceding predicted frame 24.

The FGS coding scheme provides good reliability in terms of error recovery from occasional data loss. By predicting all enhancement layers from the base layer, loss or corruption of one or more enhancement layers during transmission can be remedied by reconstructing the enhancement layers from the base layer. For instance, suppose that frame 24 experiences some error during transmission. In this case, the base layer 28 of preceding intraframe 22 can be used to predict the base layer and enhancement layers of frame 24. Unfortunately, the FGS coding scheme has a significant drawback in that the scheme is very inefficient from a coding or compression standpoint since the prediction is always based on the lowest quality base layer.

FIG. 2 depicts another conventional layered coding scheme 40 in which three frames are encoded using a technique introduced in an article by James Macnicol, Michael Frater and John Arnold, which is entitled, "Results on Fine Granularity Scalability", ISO/IEC JTC1/SC29/WG11, MPEG99/m5122 (October 1999). The three frames include a first frame 42, followed by two predicted frames 44 and 46 that are predicted from the first frame 42 and the previous frame 44. The frames are encoded into four layers: a base layer 48, a first layer 50, a second layer 52, and a third layer 54. In this scheme, each layer in a frame is predicted from the same layer of the previous frame. For instance, the enhancement layers of predicted frame 44 can be predicted from the corresponding layer of previous frame 42. Similarly, the enhancement layers of predicted frame 46 can be predicted from the corresponding layer of previous frame 44. The coding scheme illustrated in FIG. 2 suffers from a serious drawback in that it cannot easily recover from data loss. Once there is an error or packet loss in the enhancement layers, the error or packet loss propagates to the end of a GOP (group of predicted frames) and causes serious drifting in higher layers in the prediction frames that follow. This propagation is a simple example of what is called drifting error.

With the steady increase in the access bandwidth, more and more new applications are streaming audio and video contents using techniques described in articles by A. Luthra, titled "Need for simple streaming video profile", published in ISO/IEC JTC1/SC29/WG11, MPEG doc M5800, Noordwijkerhout, Netherlands, March 2000, and by J. Lu, titled "Signal processing for Internet video streaming: A review", published in SPIE in Image and Video Communication and Processing 2000, vol 3974, 246–258 (2000). These Internet streaming applications have to deal with network bandwidth fluctuations in a wide range from one user to another and from time to time. The objective of traditional video coding techniques is typically to optimize the video quality at a given bit rate. Therefore, the bit-stream generated with those methods does not adapt well to the channel bandwidth fluctuations.

In the FGS scheme, mentioned above, DCT residues between the original/predicted DCT coefficients and dequantized DCT coefficients of the base layer form the enhancement bit-stream using the bit plane technique. Since the bit plane technique provides an embedded bit-stream and fine granularity scalable capability, the FGS enhancement bit-stream can be decoded at any bit rate. Therefore, the FGS scheme can easily adapt to the channel bandwidth fluctuations. However, since its motion prediction is always based on the lowest quality base layer, the coding efficiency of the FGS scheme is not as good as, and sometimes much worse than, the traditional SNR scalable scheme. Compared with the non-scalable video coding scheme, the PSNR of the FGS scheme may drop 2.0 dB or more at the same bit rate.

A general framework has been proposed for effectively implementing the fine granularity scalability, called Progressive Fine Granularity Scalable (PFGS) video coding, in articles authored by F. Wu, S. Li and Y.-Q. Zhang, titled "DCT-prediction based progressive fine granularity scalability coding", published in *ICIP* 2000, Vancouver, Canada, vol 3, 556–559 (Sep. 10–13, 2000), and authored by F. Wu, S. Li and Y.-Q.Zhang, titled "A framework for efficient progressive fine granularity scalable video coding", and published in IEEE trans. Circuit and systems for video technology, special issue on streaming video, vol 11, no 3, 332–344 (2001), herein after collectively and individually referred to as the "Wu et al. Publications". In the PFGS framework, a high quality reference is used in the enhancement layer coding.

FIG. 3 is a prediction architecture of a PFGS layered coding scheme 300 implemented by the video encoder. FIG. 3 shows arrows with solid lines between two adjacent frames which represent temporal prediction. The arrows with dashed lines in FIG. 3 are for prediction in the transform domain, and the gray rectangular boxes denote those layers to be constructed as references. Scheme 300 encodes frames of video data into multiple layers, including a base layer 3002 and multiple enhancement layers: the first enhancement layer 302, the second enhancement layer 304, the third enhancement layer 306, and a fourth enhancement layer 308. An example of a low quality enhancement layer reference is seen at second enhancement layer 304 in the frames 2 and 4. An example of a high quality enhancement layer reference is seen at third enhancement layer 306 in the frames 3 and 5.

As can be seen in FIG. 3, each frame at the base layer is always predicted from the previous frame at the base layer, whereas each frame at an enhancement layer is predicted from the previous frame at an enhancement layer. Since the quality of an enhancement layer is always higher than that of the base layer, the PFGS scheme provides more accurate motion prediction than the FGS scheme, thus improving the coding efficiency. Experimental results of the PFGS scheme show that the coding efficiency of the PFGS scheme can be up to 1.0 dB higher in average PSNR than that of the FGS scheme at moderate or high bit rates.

Just as in the FGS scheme, the PFGS scheme generates two bit-streams: base layer bit-stream and enhancement layer bit-stream. In general, the bit rate of the base layer is low enough to fit in the minimum network bandwidth. Therefore, it can be assumed that the base layer is always available in the decoder. However, since the high quality references always comprise part of the DCT coefficients encoded in the enhancement layer, more bandwidth is needed to transmit them to the decoder. When network bandwidth drops, the decoder may partially or completely lose the high quality references. In this case, the decoder has to use the corrupted high quality references or use the low quality references instead. This would introduce some errors to the enhancement layer due to the different references used in the encoder and the decoder. The unfortunate fact is that these kinds of errors can be propagated from one frame to another through motion compensation. In the worst case, the enhancement bit-streams in successive frames are completely dropped due to network congestion. Once the decoder receives the enhancement bit-stream again, the errors that occurred in previous frames can be accumulated and then affect the frames that follow within the same Group Of Picture (GOP). Hence, the decoded quality of the enhancement layer deteriorates rapidly while the frame number increases.

FIG. 4 shows a simple example wherein the conventional MPEG-4 test sequence, known as the Foreman sequence, is encoded with the FGS scheme and the PFGS scheme. The PSNR curves of both the FGS scheme and the PFGS scheme are drawn in FIG. 4 as a graph showing the drifting phenomenon at the low enhancement bit rate. The bit rate of base layer is 128 kbits/s. The high quality references are reconstructed from the second or third bit plane in the PFGS scheme so that the total bit rate for high quality references is more than 384 kbits/s. When the PFGS bit-stream is transmitted over a network with bandwidth 256 kbits/s, the high quality references are always incompletely transmitted to the decoder. When the frame number increases, the decoded quality of the PFGS scheme can be dropped more than 2.0 dB compared with that of the FGS scheme. Moreover, the PSNR curve of the PFGS scheme is clearly drifting toward the low end. Consequently, these kinds of errors are also called drifting errors. The cause of drifting errors is that the high quality references cannot be correctly and completely transmitted to the decoder.

A method proposed in the Wu et al. Publications to eliminate the drifting errors in the PFGS scheme suggested that the high quality reference could be alternatively reconstructed from the previous base layer and the previous enhancement layer. When the high quality reference is reconstructed from the previous base layer, the encoder and decoder can always obtain the same temporal prediction. The drifting errors propagated from the previous frames can be effectively eliminated. But this method also affects the coding efficiency of the PFGS scheme, because the high quality reference does not always obtain the best quality it could get. Moreover, since the choice of temporal references is frame-based, the original PFGS scheme does not provide a good trade-off between high coding efficiency and low drifting errors. The following section briefly reviews the existing techniques to terminate or reduce the drifting errors.

Drifting Termination or Reduction

The drifting phenomena often occurs in the scalable video coding or in scenarios like transmitting video bit-streams over an error-prone channel, because either network bandwidth fluctuations or transmission corruptions can deter the decoder to obtain the same reference as that in the encoder. But, the reasons causing the losses in the high quality references are clearly different between network bandwidth fluctuations and transmission corruptions. Therefore, different approaches are applied to eliminate the drifting errors caused by transmission corruptions and network bandwidth fluctuations, respectively.

When video bit-streams are transmitted over an error-prone channel, such as the Internet and wireless channel, part of bit-streams may be dropped or corrupted due to packet losses or channel errors. In general, the decoder cannot correctly decode the corrupted bit-streams until the next resynchronization marker. Consequently, the decoded image is different from the reconstructed image in the encoder, thus inevitably causing the drifting errors.

To eliminate the drifting errors caused by transmission corruptions, a simple and standard compatible method is to refresh picture regions with the INTRA macroblock, because the INTRA macroblock can locally cut the temporal dependency of successive frames. This method is set forth in several publications, including a first publication authored by P. Chang and T. Lee, titled "Precise and fast error tracking for error-resilient transmission of H.263 video", and published in IEEE trans. Circuit and systems for video technology, vol 10, no 4, 600–607 (2000), a publication authored by J. Liao and J. Villasenor, titled "Adaptive intra block update for robust transmission of H.263", and published in IEEE trans. Circuit and systems for video technology, vol 10, no 1, 30–35 (2000), and a publication authored by E. Steinbach, N. Farber and B. Girod, titled "Standard compatible extension of H.263 for robust video transmission in mobile environments", published in IEEE trans. Circuit and systems for video technology, vol 7, no 6, 872–881 (1997).

Two strategies are often applied to determine how to insert the INTRA macroblocks to the predicted frame. Since the encoder can't receive any feedback from the decoder, the INTRA macroblocks are periodically and regularly inserted in the predicted frame. To rapidly eliminate the drifting errors, the INTRA refresh rate has to be rather high, which will result in low coding efficiency. If feedback were to be sent back by the decoder to the encoder for video regions that could not be decoded successfully, then the INTRA mode decision could be reasonably made at the macroblock level as part of the encoding control.

NEWPRED is another method to eliminate the drifting errors caused by transmission corruptions as set forth in two (2) publications, the first of which was authored by I. Rhee and S. Joshi, titled "Error recovery for interactive video transmission over the Internet", published in IEEE Journal of selected areas in communications, vol 18, no 6, 1033–1049 (2000), and the second of which was authored by H. Kimata, Y. Tomita, H. Yamaguchi and S. Ichinose, titled "Study on adaptive reference picture selection coding scheme for the NEWPRED", published in Global Telecommunications Conference, vol 3, 1431–1436 (1998). In the NEWPRED method, the receiving side transmits an ACKnowledgement (ACK) signal or a Negative ACKnowledgement (NACK) signal to notify the transmitting side whether or not a picture is correctly decoded. An ACK signal is transmitted when the receiving side correctly decoded the video bit-stream. A NACK signal is transmitted when the receiving side does not correctly decode the video bit-stream. In the next frame, the encoder uses for prediction only those images that are correctly received.

Only the periodic INTRA refresh can be used in the PFGS scheme, because other methods need to on-line control the encoding process. Although streaming video applications can get feedback from the clients, the server can't yet adjust the coding parameters and flows of the PFGS scheme, because the PFGS bit-streams are generated in advance and then stored in the server. On the other hand, since the coding efficiency of INTRA mode is lower than that of INTER mode, if too many INTRA macroblocks are applied, this would decrease rapidly the coding efficiency of the PFGS scheme. Therefore, the INTRA refresh method isn't an appropriate for the PFGS scheme.

Some video coding schemes are used to terminate and reduce the drifting errors in the traditional scalable video coding, such as PSNR scalability and spatial scalability, as set forth in several publications:

(i). J. Arnold, M. Frater and Y. Wang, "Efficient drift-free signal-to-noise ratio scalability", IEEE trans. Circuit and systems for video technology, vol 10, no 1, 70–82 (2000);

(ii) C. Herpel and H. Hepper, "Multiple loop decoder for TM1 scalable mode", ISO/IEC JTC1/SC29/WG11, MPEG92, doc 288 (1992);

(iii) R. Mathew and J. F. Arnold, "Layer coding using bitstream decomposition with drift correction", IEEE trans. Circuit and systems for video technology, vol 7, no 6, 882–891 (1997); and (iv) O. Werner, "Drift analysis and drift reduction for multiresolution hybrid video coding", Signal Processing: Image communication, vol 8, 387–409 (1996).

In the coding schemes proposed in the foregoing publications, since there is often one motion compensation in the encoder, a full resolution or high quality image is used as the reference for prediction and reconstruction. When one considers a decoder capability of only accepting the base layer bit-stream, the reconstructed image in the base layer decoder is different from that in the encoder, thus causing the drifting errors. A scheme known as the two-loop scheme is the most effective method to terminate this kind of drifting errors. Another method is to transmit an additional correction signal to minimize or even eliminate the drifting errors. This method was published in two publications, the first being authored by R. Mathew and J. F. Arnold, titled "Layer coding using bitstream decomposition with drift correction", and published in IEEE trans. Circuit and systems for video technology, vol 7, no 6, 882–891 (1997), and the second being authored by O. Werner, titled "Drift analysis and drift reduction for multiresolution hybrid video coding", and published in Signal Processing: Image communication, vol 8, 387–409 (1996). In this method, the base layer decoder is incorporated in the encoder to reconstruct the images of the base layer. The differences between the base layer prediction and the processed enhancement layer prediction are compressed into a separate bit-stream as the drifting correction signal. If the network bandwidth is not allowed to transmit the whole enhancement bit-stream to the decoder, the drifting correction bit-stream is transmitted and decoded instead to eliminate the drifting errors in the base layer video.

In fact, the PFGS scheme already is a two-loop scalable video coding, because two different quality references are used in the base layer and the enhancement layer coding, respectively. The low quality references are reconstructed only from the DCT coefficients of the base layer, whereas the high quality references are reconstructed from the joint DCT coefficients of the base layer and the low enhancement layer. Thereby the difference between the low quality reference and high quality reference is the DCT coefficients encoded in the low enhancement layer. In other words, the low enhancement bit-stream essentially is a drifting correction signal.

The reason causing the losses in the high quality references is different from the traditional scalable coding. The traditional scalable coding provides only coarse scalability in which bit-stream can be decoded only at a few fixed layers, but not something in between. However, the PFGS scheme provides a fine granularity scalable coding such that the enhancement bit-stream can be decoded at any point to dynamically fit in the channel bandwidth. Due to the channel bandwidth fluctuations, the low enhancement bit-stream in some frames may be partially or completely dropped, whereas other frames may obtain the whole low enhancement bit-stream. Losses in the low enhancement bit-stream are just the reason causing the drifting errors. Therefore, the method using the low enhancement bit-stream as a drifting correction signal in the PFGS scheme does not completely eliminate drifting error.

Another method that can be used was proposed in the Wu et al. publications. These publications suggested that the high quality reference of every two frames can be reconstructed from the previous low quality reference, which can reduce the drifting error in the PFGS scheme. But this method simultaneously drops the coding efficiency, because the high quality reference does not obtain the best quality it could get. Moreover, since the choice of temporal references for reconstruction is frame-based in the Wu et al. publications, the original PFGS scheme provides a poor trade-off between high coding efficiency and low drifting errors.

In order to effectively reduce the drifting errors described above the causes thereof should be understood and modeled in the encoder to show the occurrence and propagation of drifting errors. Briefly, the drifting problem in PFGS video coding arises from the fact that high quality references are used in the enhancement layer to improve its coding efficiency. However, the high quality references cannot be always available in the decoder due to network bandwidth fluctuations. If the high quality references in the decoder mismatch those in the encoder, drifting errors will inevitably occur. In view of the foregoing, it would be an advance in the art to reduce drifting error in motion-compensated video coding, including the PFGS video coding mode.

SUMMARY

A video encoding scheme reduces drifting error in motion-compensated video coding. The scheme employs progressive fine-granularity scalable (PFGS) layered coding to encode video frames into multiple layers, including a base layer of comparatively low quality video and multiple enhancement layers of increasingly higher quality video. Drifting information that occurs during the encoding is estimated. Based upon the estimate, a choice is made as to a coding mode for each macroblock in the enhancement layer according to a trade-off between high coding efficiency and low drifting errors.

BRIEF DESCRIPTION OF THE DRAWINGS

Generally, the same numbers are used throughout the drawings to reference like elements and features.

FIG. 17 is a diagrammatic illustration of a layered coding scheme that shows seven additional video coding schemes, for the P frame in spatial scalability, and that are used to reduce drifting error.

DETAILED DESCRIPTION

This disclosure describes progressive fine-granularity scalable (PFGS) layered video coding to encode video frames into multiple layers, including a base layer of comparatively low quality video and multiple enhancement layers of increasingly higher quality video. The scheme reduces the drifting errors in the PFGS scheme.

A discussion is first had of system architecture, including an encoder and decoder, for the PFGS layered video coding and drifting error reduction implementations disclosed herein. An analysis and modeling of drifting error is then presented. This analysis discusses the occurrence and propagation of the drifting errors in the PFGS scheme. An iterative drifting model is established in the encoder to simulate and estimates the drifting errors that occur in the decoder. Since cause of the loss of the high quality references differs from that in the traditional video coding, the existing approaches to terminate or reduce the drifting errors are either inapplicable or unsuitable for the PFGS scheme. Hence, the drifting error reduction implementations disclosed herein adapt the drifting reduction method proposed in the Wu et al. Publications at the macroblock level with three INTER coding modes for the enhancement layer coding. The distinctions among the three INTER coding modes for the enhancement layer coding are that there are different references that used for prediction and reconstruction. With the information estimated by the drifting model, two decision-making mechanisms are presented to optimally choose one of the three INTER coding modes for each macroblock.

The PFGS scheme with the three INTER modes and the two decision-making mechanisms implemented herein can effectively reduce the drifting errors at low bit rates, while providing high coding efficiency at moderate or high bit rates. Another advantage of these implementations is that there is only an increase the computational complexity of the encoder, while there is no any extra computation needed in the decoder, thus making the implementations very suitable for streaming video applications.

Exemplary System Architecture

Figure 5:
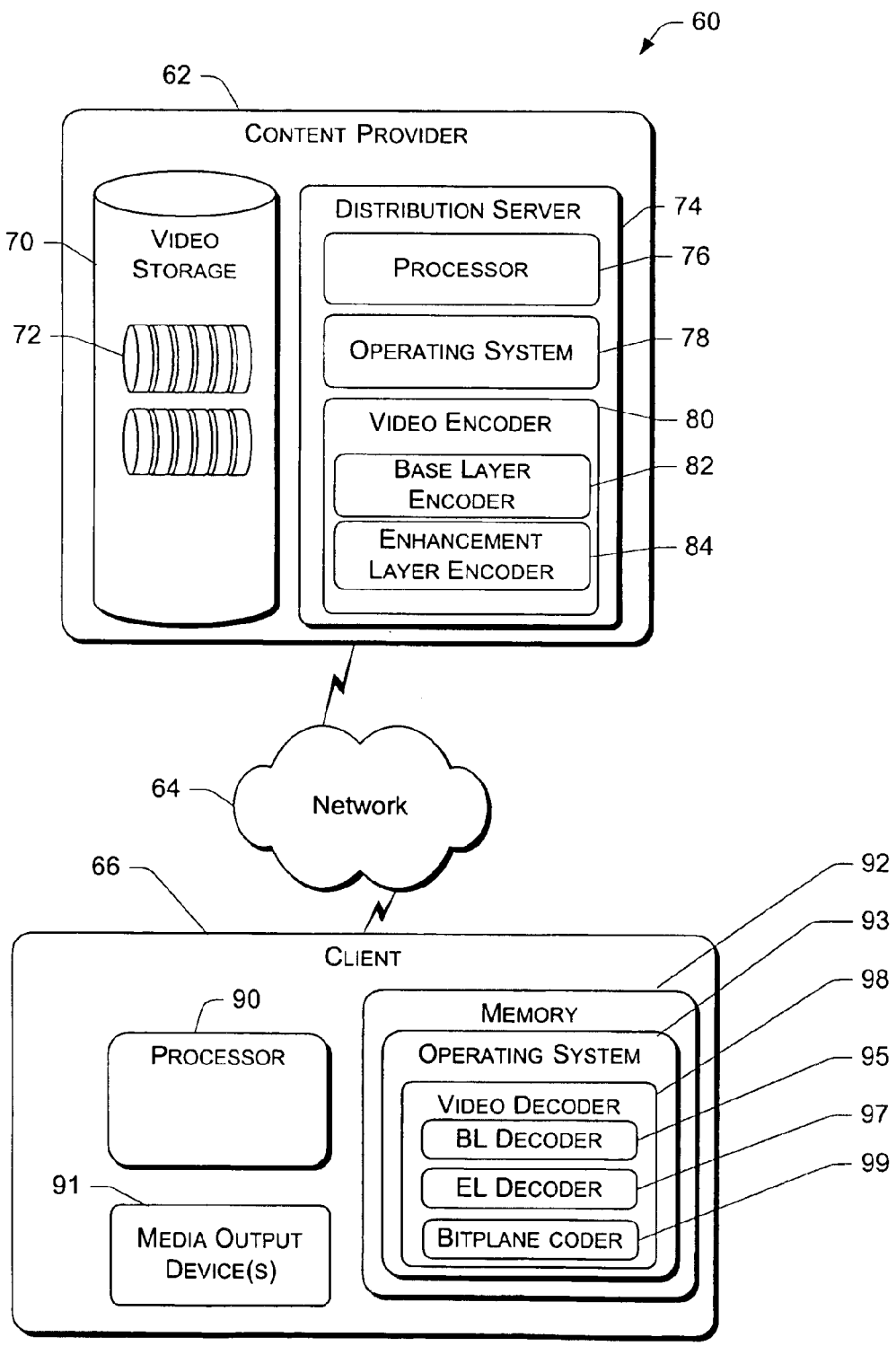
FIG. 5 is a block diagram of a video distribution system in which a content producer/provider encodes video data and transfers the encoded video data over a network to a client.

FIG. 5 shows a video distribution system 60 in which a content producer/provider 62 produces and/or distributes video over a network 64 to a client 66. The network is representative of many different types of networks, including the Internet, a LAN (local area network), a WAN (wide area network), a SAN (storage area network), and wireless networks (e.g., satellite, cellular, RF, etc.).

The content producer/provider 62 may be implemented in many ways, including as one or more server computers configured to store, process, and distribute video data. The content producer/provider 62 has a video storage 70 to store digital video files 72 and a distribution content provider 62 to encode the video data and distribute it over the network 64. The content provider 62 has a processor 76, an operating system 78 (e.g., Windows NT, Unix, etc.), and a video encoder 80. The video encoder 80 may be implemented in software, firmware, and/or hardware. The encoder is shown as a separate standalone module for discussion purposes, but may be constructed as part of the processor 76 or incorporated into operating system 78 or other applications (not shown).

The video encoder 80 encodes the video data 72 using a motion-compensation-based coding scheme. More specifically, the encoder 80 employs a progressive fine-granularity scalable (PFGS) layered coding scheme. The video encoder 80 encodes the video into multiple layers, including a base layer and one or more enhancement layers. "Fine-granularity" coding means that the difference between any two layers, even if small, can be used by the decoder to improve the image quality. Fine-granularity layered video coding makes sure that the prediction of a next video frame from a lower layer of the current video frame is good enough to keep the efficiency of the overall video coding.

The video encoder 80 has a base layer encoding component 82 to encode the video data into the base layer and an enhancement layer encoding component 84 to encode the video data into one or more enhancement layers. The video encoder encodes video data for the base and enhancement layers as will be discussed below. Various implementations of the video encoder 80 are described below in more detail with reference to FIGS. 9, 13, and 14.

The client 66 is equipped with a processor 90, a memory 92, and one or more media output devices 91. The memory 92 stores an operating system 93 (e.g., a Windows-brand operating system) that executes on the processor 90. The operating system 96 implements a client-side video decoder 98 to decode the layered video streams into the original video. In the event data is lost, the decoder 98 is capable of reconstructing the missing portions of the video from frames that are successfully transferred. The client-side video decoder 98 has a base layer decoding component 95, an enhancement layer decoding component 97, and optionally a bit-plane coding component 99. Various implementations of the video decoder 98 are described below in more detail with reference to FIGS. 10, 13, and 14.

Following decoding, the client stores the video in memory and/or plays the video via the media output devices 91. The client 66 may be embodied in many different ways, including a computer, a handheld entertainment device, a set-top box, a television, an Application Specific Integrated Circuits (ASIC) and so forth.

Figure 6:
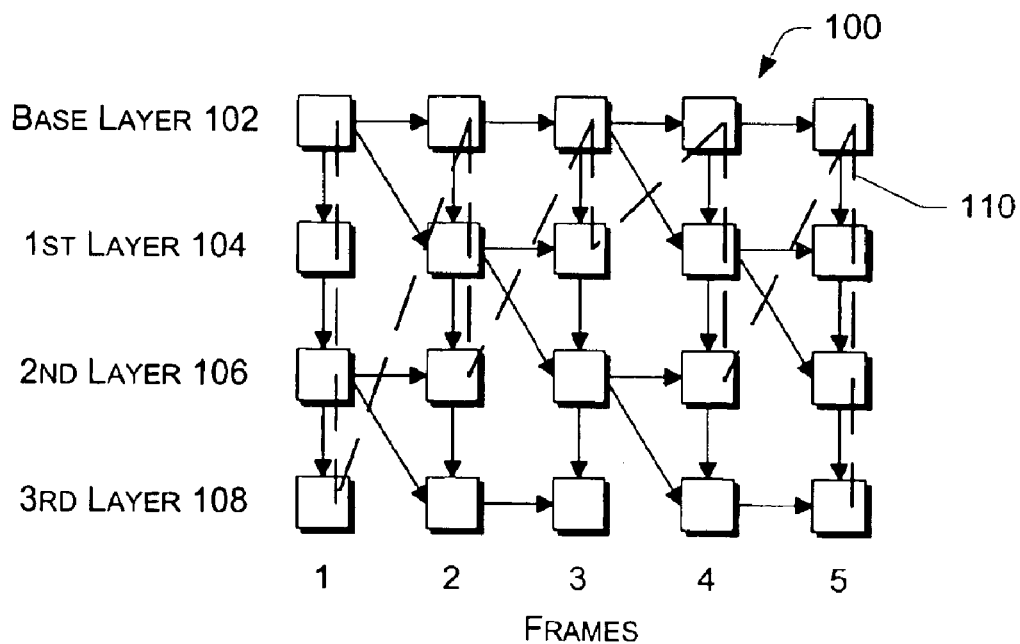
FIG. 6 is diagrammatic illustration of a layered coding scheme that shows how the number of layers that are transmitted over a network can be dynamically changed according to bandwidth availability.

FIG. 6 shows an example of a bandwidth adaptation property for a PFGS video coding scheme. A dashed line 110 traces the transmitted video layers. At frames 2 and 3, there is a reduction in bandwidth, thereby limiting the amount of data that can be transmitted. At these two frames, the content provider 62 simply drops the higher layer bits (i.e., the third layer 108 is dropped from frame 2 and the second and third layers 106 and 108 are dropped from frame 3). However after frame 3, the bandwidth increases again, and the content provider 62 transmits more layers of video bits. By frame 5, the decoder at the client can once again obtain the highest quality video layer.

Figure 7:
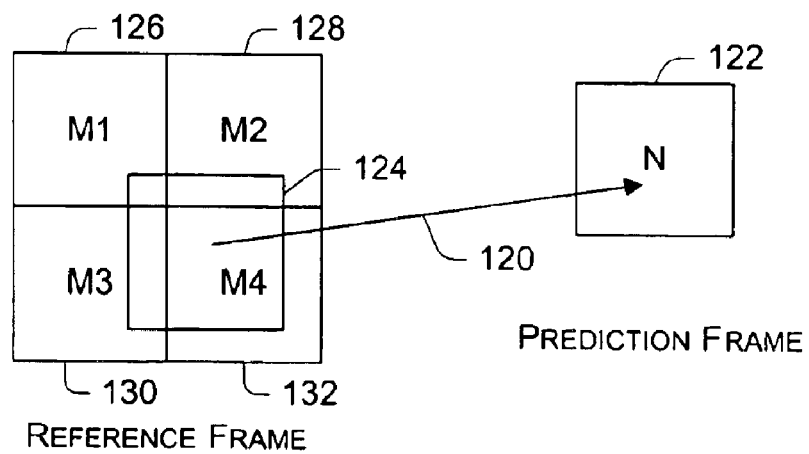
FIG. 7 is a diagrammatic illustration of a macroblock in a prediction frame predicted from a reference macroblock in a reference frame according to a motion vector.

FIG. 7 shows an example in which a motion vector 120 of a macroblock (MB) 122 in a prediction frame that points to a reference macroblock 124 in a reference frame. The reference MB 124 does not necessarily align with the original MB boundary in the reference frame. In a worst case, the reference MB 124 consists of pixels from four neighboring MBs 126, 128, 130, and 132 in the reference frame. Now, assume that some of the four neighboring MBs 126–132 have experienced packet loss or error, and each of them has been reconstructed to the maximum error free layer. For example, MBs 126–132 have been reconstructed at layers M1, M2, M3, and M4, respectively. The reference MB 124 is composed by pixels from the reconstructed four neighboring MBs 126–132 in the reference frame at a layer equal to the minimum of the reconstructed layers (i.e., min(M1,M2,M3,M4)). As a result, the MB 122 being decoded in the prediction frame is decoded at a maximum layer equal to 1+min(M1,M2,M3,M4). When so decoded, no drifting error is introduced and an error-free frame is reconstructed over a few frames depending on the number of layers used by the encoder.

Figure 8:
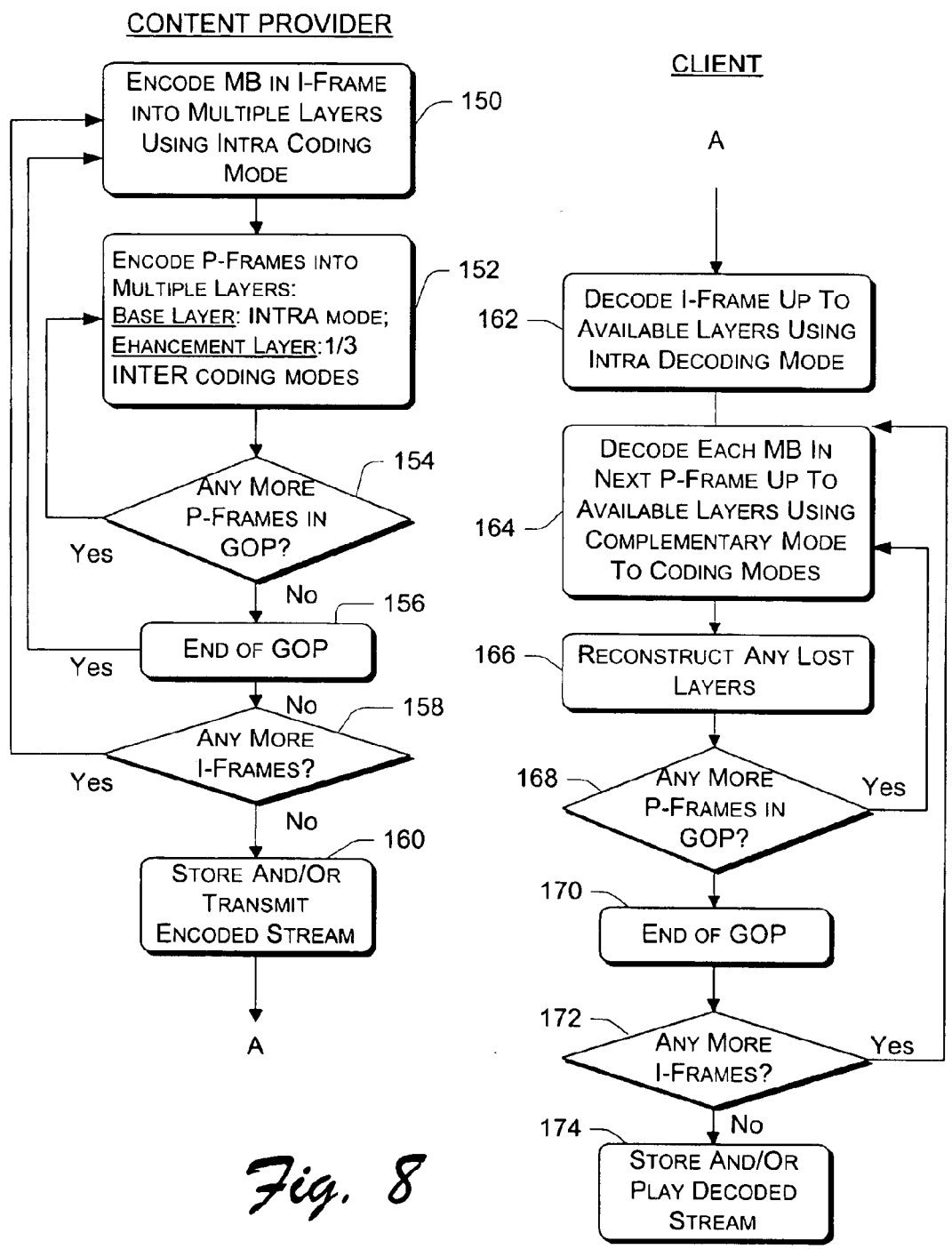
FIG. 8 is a flow diagram showing a general method for encoding, and then decoding, video data using a layered coding scheme.

FIG. 8 shows a general layered coding process implemented at the side of the content provider at encoder 80 and at the client-side decoder 98. The process may be implemented in hardware and/or software. The process is described with reference to FIG. 6.

At step 150, the encoder 80 encodes each macroblock in a reference or intraframe (or "I-frame") into different layers. With reference to FIG. 6, when frame 1 is an I-frame, the encoder 80 forms the base and three enhancement layers 102–108 using the INTRA coding mode, discussed below. At step 152, the encoder 80 encodes each predicted frame (or "P-frame") into different layers. Thus, for each of frames 2–5, the encoder 80 will encode the base layer 102 of each P-frame 2–5 according to the traditional coding mode. Encoder 80 will encode the enhancement layers 104–108 of P-frames 2–5 in the INTER video coding mode. As will be discussed below, one of three different INTER coding modes are used for the encoding of the enhancement layers of the P-frames.

At step 154, the encoder evaluates whether there are any more P-frames in the group of P-frames (GOP). If there are (i.e., the "yes" branch from step 154), the next P-frame is encoded in the same manner. Otherwise, all P-frames for a group have been encoded (step 156).

The process continues until all I-frames and P-frames have been encoded, as represented by the decision step 158. Thereafter, the encoded bitstream can be stored in its compressed format in video storage 70 and/or transmitted from content provider 62 over the network 64 to the client 66 (step 160). When transmitted, content provider 62 transmits the base layer within the allotted bandwidth, along with error checking such as Forward Error Correction (FEC), to ensure delivery of the base layer. The content provider 62 also transmits one or more enhancement layers according to bandwidth availability, as demonstrated in FIG. 6. As bandwidth fluctuates, the content provider 62 transmits more or less of the enhancement layers to accommodate the changing network conditions.

The client 66 receives the transmission and the decoder 98 decodes the I-frame up to the available layer that successfully made the transmission (step 162). The decoder 98 next decodes each macroblock in each P-frame up to the available layers (step 164) in accordance with the coding mode that was coded by video encoder 80. If one or more layers were not received or contained errors, the decoder 98 attempts to reconstruct the layer(s) at step 166). The decoder decodes all P-frames and I-frames in the encoded bitstream (steps 168–172). At step 174, the client stores and/or plays the decoded bitstream.

Exemplary Encoder

Figure 9:
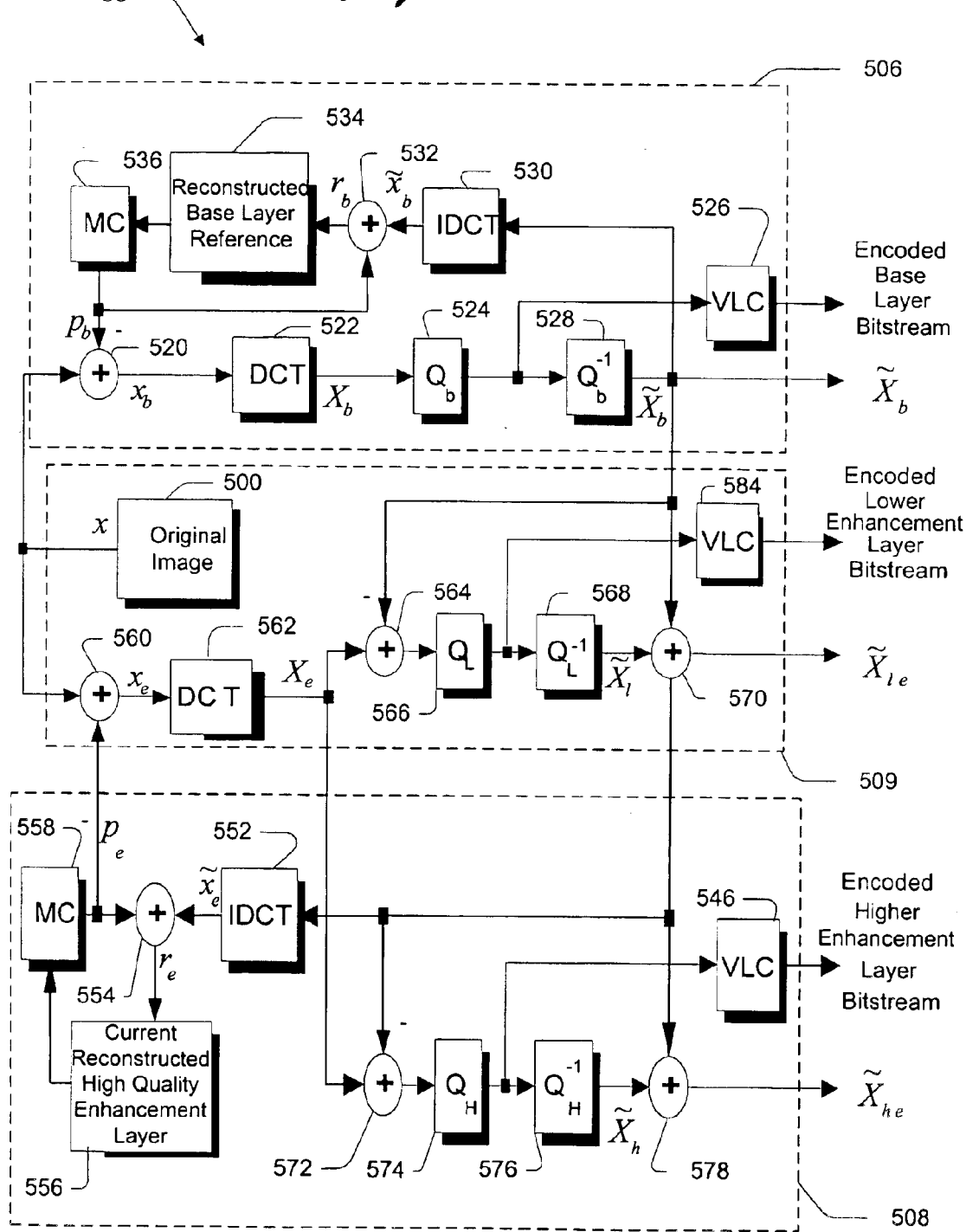
FIG. 9 is a block diagram of an exemplary video encoder implemented at the content producer/provider.

FIG. 9 shows one exemplary implementation of a video encoder 80, which may be implemented by content provider 62 to encode the video data files prior to distribution over the network 64 as illustrated by encoder 80 in FIG. 5. The video encoder 80 is configured to code video data according to a PFGS layered coding scheme so as to use multiple reference layers for image prediction. In particularly, the illustrated architecture implements a PFGS layered coding scheme in which high-level reconstructed layers can be used for reference.

A convention for symbols used in the equations below and also in the Figures will now be explained. Lowercase letters denote an image in pixel domain. Uppercase letters denote an image in DCT domain (e.g. DCT coefficients). The subscript "b" indicates the base layer, and the subscript "e" indicates the enhancement layer. The marker "~" on the top of letter both denote a reconstruction. The marker "~" on the top of an uppercase letter denotes reconstructed DCT coefficients in the encoder. The lowercase "r" denotes a reconstructed image in the pixel domain. The marker "^" on the top of a letter denotes decoding. The marker "^" on top of an uppercase letter denotes decoded DCT coefficients. The marker "^" on top of a lowercase letter denotes a decoded image in the pixel domain. Thus, according to the foregoing convention, $x_b$ denotes the base layer of an image in the pixel domain and $x_e$ denotes an enhancement layer of an image in the pixel domain. Stated otherwise, FIG. 9 shows $x_b$ as the first predicted residual image and $x_e$ as the second predicted residual image.

For simplicity, the motion estimation modules have been omitted from FIG. 9. It is understood, however, that motion estimation is performed between current and previous original images. The motion vectors thereby obtained are used in both of the Motion estimation and Compensation (MC) modules 536 and 558 in FIG. 9. The video encoder 80 receives a video data input stream at an original image module 500. Pixel domain representations of the incoming image frames are directed to MC modules 536 and 558 in FIG. 9 to estimate movement of objects in the frame. MC modules 536 and 558 receive, for reference for the current input as will be explained below, previously reconstructed frames stored in frame buffers 534, 556, respectively. MC modules 536 and 558 include motion compensator aspects that in turn produce predicted images $p_b$, $p_e$, respectively, in the pixel domain. MC module 536 predicts images by referencing the reconstructed base layer as a reference in frame buffer 534. MC module 558 predicts images by referencing a current reconstructed high quality enhancement layer in frame buffer 556. Although the two MC modules 536 and 558 are illustrated, they may be integrated as a single component. MC modules 536 and 558 are well-known components used in conventional MPEG encoding.

Based Layer Formation

The following is a discussion of the formation of the base layer in both DCT coefficients and in the pixel domain. Original image x, in pixel domain, is stored at 500. A predicted images $p_b$ from MC module 536, discussed above, can be subtracted from original image 500 at residue module 520 to form a pixel domain base layer representation $x_b$. Then $x_b$ is input to a DCT module 522 to form DCT coefficients $X_b$ for the base layer. Base layer DCT coefficients $X_b$ are quantized at quantizer module $Q_b$ at 524 and then dequantized at dequantizer module $Q^{-1}_b$ at 528 to form reconstructed base layer DCT coefficients $\tilde{X}_b$ at 528. Alternatively, the result of the quantizing of base layer $X_b$ at quantizer module $Q_b$ at 524 can be compressed in Varible Length Coding (VLC) at VLC module 526 to produce the encoded base layer bitstream.

Reconstructed base layer DCT coefficients $\tilde{X}_b$ at 528 is then subjected to an Inverse Discrete Cosine Transform (IDCT) at IDCT module 530 to form the reconstructed base layer in pixel domain $\tilde{x}_b$ that is stored at 534 as the current reconstructed base layer reference $r_b$. Motion estimation and Compensation (MC) is applied at MC module 536 to the current reconstructed base layer reference $r_b$ to form a low quality temporal prediction $p_b$ of the base layer in the pixel domain.

A difference can be computed at residual module 520 between the original image x in the pixel domain at 500 and the low quality temporal prediction $p_b$ of the bass layer in the pixel domain to form a new pixel domain base layer $x_b$. The foregoing process then repeats for formation of both the reconstructed base layer DCT coefficients $\tilde{X}_b$ at 528 and the encoded base layer bitstream at VLC module 526.

Enhancement Layer Formation

The following is a discussion of the formation of the high and low quality enhancement layers. The first formation to be discussed in the low quality enhancement layer.

Low Quality Enhancement Layer Formation

Predicted images $p_e$ from MC module 558, discussed above, can be subtracted from original image 500 at residue module 560 to form a pixel domain base layer representation $x_e$. Then $x_e$ is input to a DCT module 562 and is transformed from the pixel domain to form DCT coefficients $X_e$ for the enhancement layer. The residues between enhancement layer DCT coefficients $X_e$ and the reconstructed coefficients $\tilde{X}_b$ are quantized at quantizer module $Q_L$ at 566 and then dequantized at dequantizer module $Q^{-1}_L$ at 568 to form reconstructed lower enhancement layer DCT coefficients $\tilde{X}_l$. Alternatively, the result of the quantizing of the residues between enhancement layer DCT coefficients $X_e$ and the reconstructed coefficients $\tilde{X}_b$ at quantizer module $Q_L$ at 566 can be subjected to Varible Length Coding (VLC) at VLC module 584 to produce the Encoded Lower Enhancement Layer Bitstream. Reconstructed lower enhancement layer DCT coefficients $\tilde{X}_l$ can be added at residue module 570 to the reconstructed base layer DCT coefficients $\tilde{X}_b$ to compute a new reconstructed lower enhancement layer DCT coefficients $\tilde{X}_{le}$.

High Quality Enhancement Layer Formation

Reconstructed lower enhancement layer DCT coefficients $\tilde{X}_{le}$ are subjected to an Inverse Discrete Cosine Transform (IDCT) at IDCT module 552 to form a reconstructed enhancement layer in pixel domain $\tilde{x}_e$. MC module 558, discussed above, operates on the current reconstructed high quality enhancement layer reference $r_e$ to form a high quality temporal prediction $p_e$ of the enhancement layer in the pixel domain. At residual module 554, the sum of $p_e$ and $\tilde{x}_e$ is taken and the result is stored at 556 as the new current reconstructed high quality enhancement layer reference $r_e$. Enhancement layer DCT coefficients $X_e$ are subtracted from reconstructed lower enhancement layer DCT coefficients $\tilde{X}_{le}$ at a residue module 572, the result of which is quantized at quantizer module $Q_H$ at 574 and then dequantized at dequantizer module $Q^{-1}_H$ at 576 to form reconstructed higher enhancement layer DCT coefficients $\tilde{X}_h$. Alternatively, the result of quantizer module $Q_H$ at 574 can be compressed in Varible Length Coding (VLC) at VLC module 546 to produce the Encoded Higher Enhancement Layer Bitstream. Reconstructed higher enhancement layer DCT coefficients $\tilde{X}_h$ can be summed at residue module 578 with reconstructed lower enhancement layer DCT coefficients $\tilde{X}_l$ and reconstructed base layer DCT coefficients $\tilde{X}_b$ to compute a new reconstructed higher enhancement layer DCT coefficients $\tilde{X}_{he}$.

Improvements to the Low and High Quality Enhancement Layer Formations

Coding efficiencies can be seen in FIG. 9 for both the low and high quality enhancement layers. With respect to the low quality enhancement layer formation, the high quality temporal prediction $p_e$ of the enhancement layer in the pixel domain can be subtracted from the original image x in the pixel domain at residual module 560 to compute a revised pixel domain enhancement layer representation $x_e$. The computations performed upon pixel domain enhancement layer representation $x_e$ then precedes as discussed above. With respect to the current reconstructed high quality enhancement layer reference $r_e$, the high quality temporal prediction $p_e$ of the enhancement layer in the pixel domain can be summed with the reconstructed enhancement layer in pixel domain $\tilde{x}_e$ from IDCT module 552 to form a new current reconstructed high quality enhancement layer reference $r_e$ that is store at 556.

The function of VLC modules 526, 546, and 546 are to encode DCT residues into bit planes and to compress the bit planes into the bitstreams. Although multiple VLC modules are illustrated, it is noted that a common VLC may be used for all compression being performed on the base layer and enhancement layer data.

The number of bit planes encoded in the enhancement layer is not fixed, but based on the number of bits needed to represent the maximum residues in binary format. All bit planes are divided into two layers: the low enhancement layer and the high enhancement layer. Only the bit planes in the low enhancement layer are used to reconstruct the high quality references, whereas the bit planes in the high enhancement layer are not used to reconstruct the high quality references. Therefore, the quantization modules $Q_L$ at 566 and $Q_H$ at 574 in FIG. 9 essentially are used to extract different bit planes from the DCT residues between DCT coefficients $X_e$ produced from DCT module 562 and the reconstructed DCT coefficients $\tilde{X}_b$ produced from dequantizer module $Q^{-1}{}_b$ at 528. In general, there are 1~3 lower bit planes in the low enhancement layer dependent on the given bit rate for the high quality references.

Figure 1:
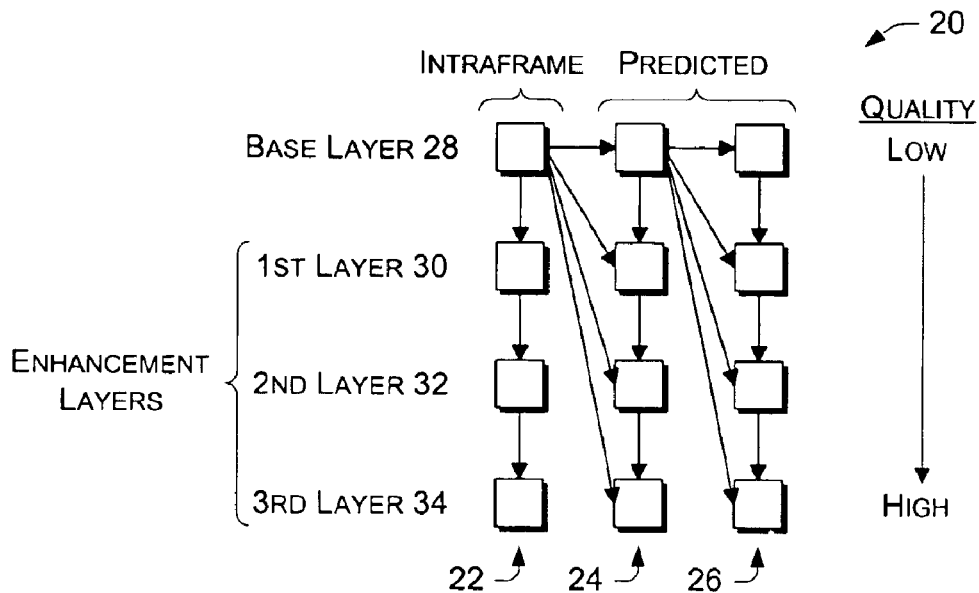
FIG. 1 is a diagrammatic illustration of a prior art layered coding scheme in which all higher quality layers can be predicted from the lowest or base quality layer.
Figure 2:
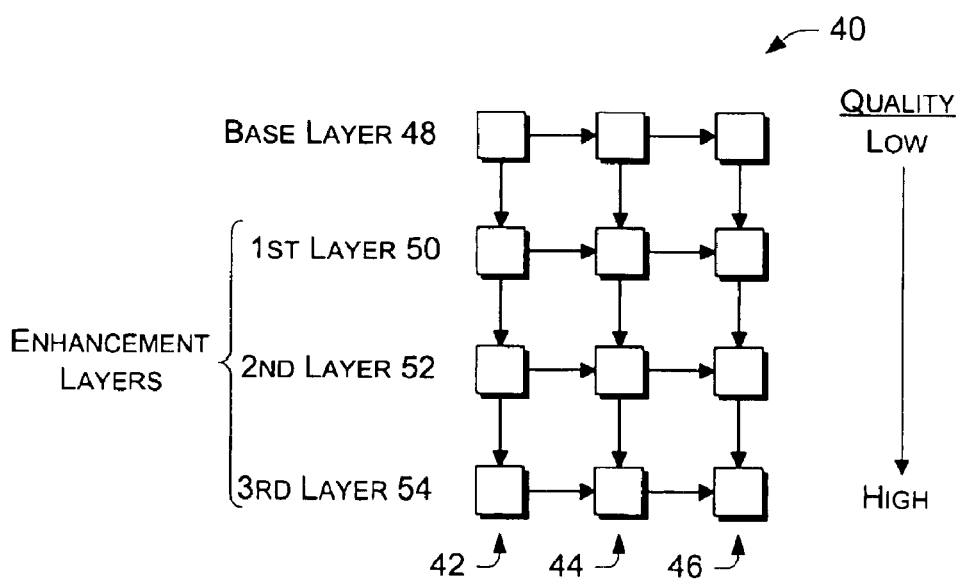
FIG. 2 is a diagrammatic illustration of a prior art layered coding scheme in which frames are predicted from their corresponding quality layer components in the intraframe or reference frame.
Figure 3:
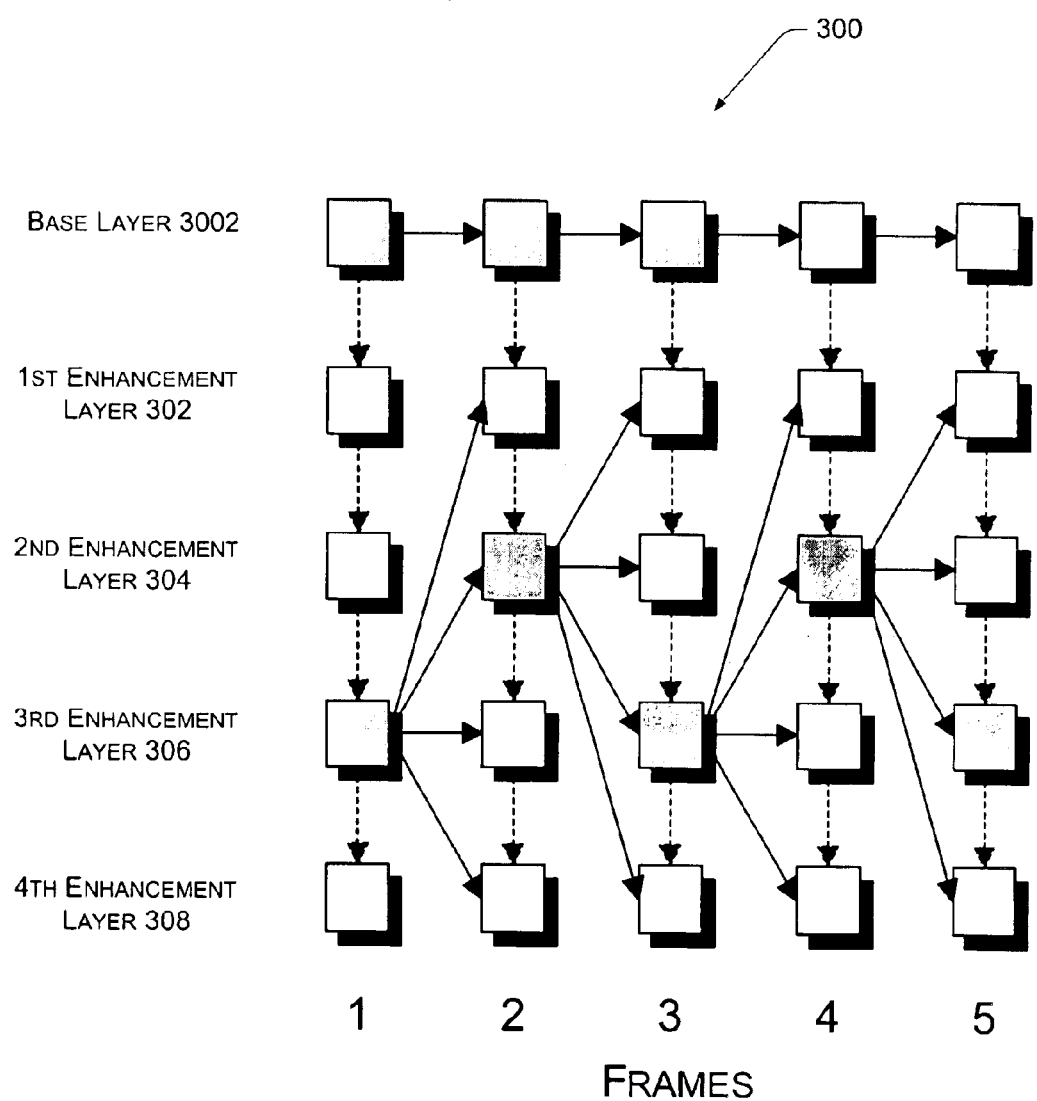
FIG. 3 is a diagrammatic illustration of a PFGS prediction architecture scheme.
Figure 4:
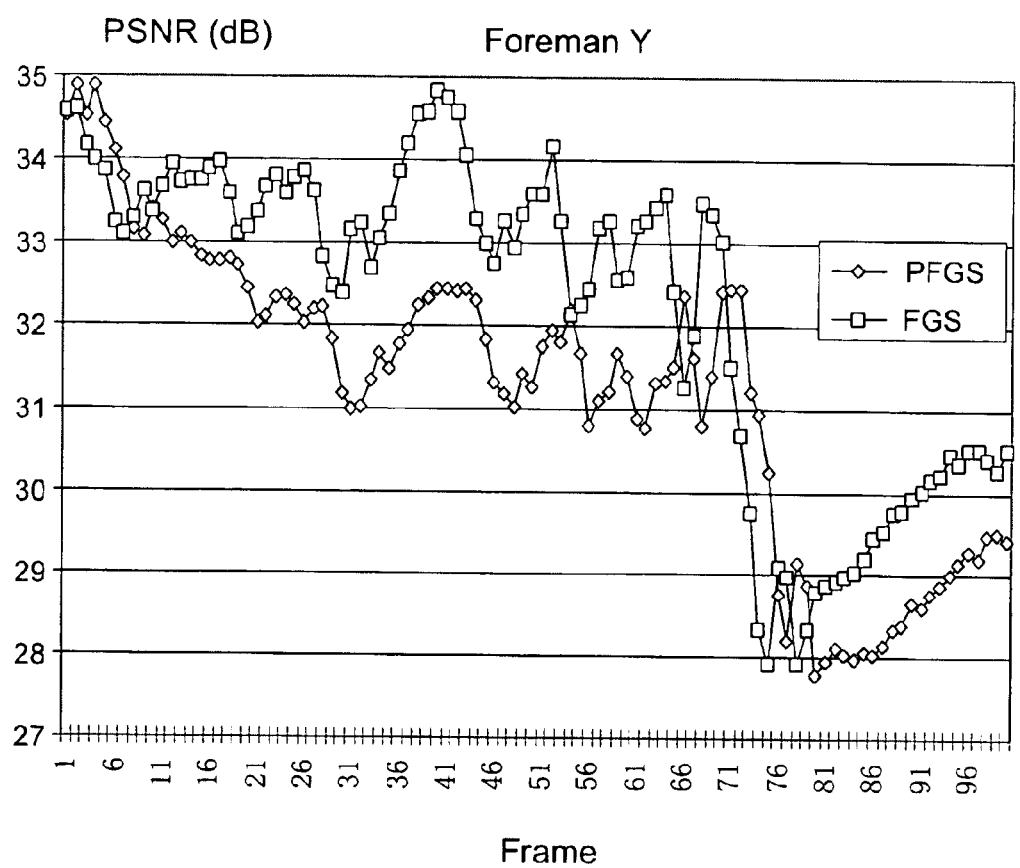
FIG. 4 is graph illustrating, for both PFGS and FGS video coding, the relationship between peak signal to noise ratio (PSNR) versus frame number, and particularly showing a drifting phenomenon at a low enhancement bit rate.

After the inverse DCT transforms at IDCT modules 530 and 552, the reconstructed DCT coefficients $\tilde{X}_b$ at 528, plus the low quality temporal prediction $p_b$ at 536 generates at residual module 532 the current reconstructed base layer reference $r_b$ at 534. As can be seen in FIG. 3, the base layer in every frame is a low quality reference. Similarly, the reconstructed DCT coefficients of the base layer $\tilde{X}_b$ at 528 and low enhancement layer DCT coefficients $\tilde{X}_l$ at 568, when added at residue module 554 to the high quality temporal prediction $p_e$ at 558 generate the current high quality reference $r_e$ stored at 556. Except for the high and low quality temporal predictions $p_e$ at 558 and $p_b$ at 536, respectively, the difference between $r_e$ stored at 556 and $r_b$ stored at 534 is the reconstructed low quality enhancement layer DCT coefficients $\tilde{X}_l$.

If the encoded low quality enhancement layer bitstream can be correctly and completely transmitted to decoder 98 after encoding at Varible Length Coding module 584, the same high quality reference can be obtained as that in the encoder 80. But, if the low quality enhancement layer bitstream is partially or completely dropped during transmission, the high quality reference obtained in the decoder 98 is different from the reference used in the encoder 80. This means that some errors are introduced to the high quality references in the decoder 98.

Since there are two references used in the PFGS encoder, it produces two sets of predicted DCT coefficients. (1) A first set of predicted DCT coefficients $X_b$ at 522 are prediction errors formed by referencing the previous low quality reference, and (2) a second set of predicted DCT coefficients $X_e$ at 562 are prediction errors formed by referencing the previous high quality reference. $X_b$ is encoded in the base layer at quantizer $Q_b$ at 524 to generate the base layer bit stream at Varible Length Coding (VLC) module 526. The differences taken at residue module 564 between enhancement layer DCT coefficients $X_e$ at 562 and the reconstructed base layer DCT coefficients $\tilde{X}_b$ at 528, when quantized at quantizer $Q_L$ at 566 and encoded at VLC module 584, generate the encoded lower enhancement layer bit-stream with the bit plane coding technique.

Exemplary Decoder

Figure 10:
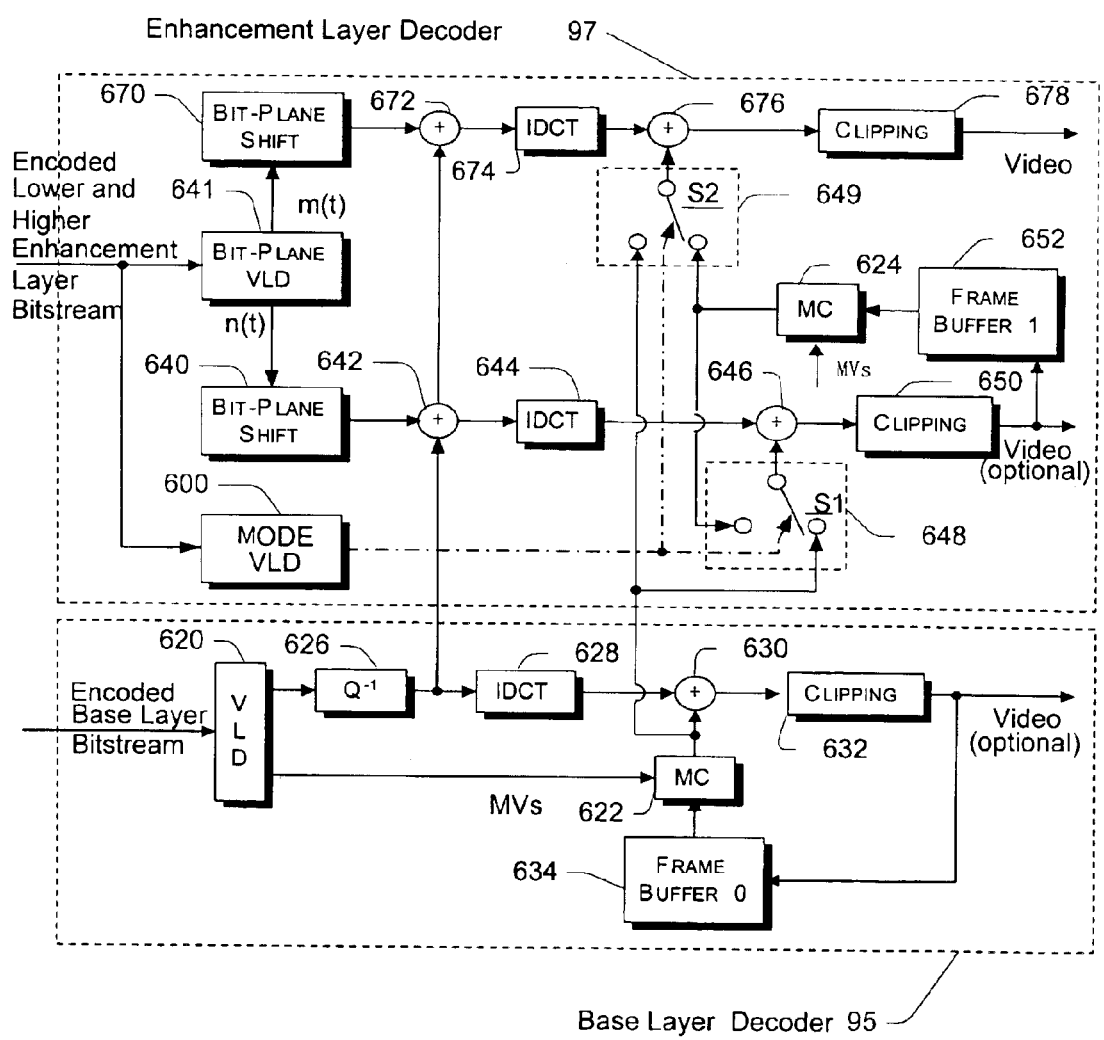
FIG. 10 is a block diagram of an exemplary video decoder implemented at the client.

FIG. 10 shows a complementary video decoder 98, which may be implemented by client 66, to decode the video data files received over the network 64 as seen in FIG. 5. The decoder 98 has a VLD decoder 620 to receive the encoded base layer bitstream, and a bitplane VLD decoder 641 to receive the encoded lower and higher enhancement layer bitstream.

The exemplary macroblock-based PFGS decoder seen in FIG. 10 can implement the decoding in each of the three (3) different INTER modes. There are two references seen in the decoder. The first reference is stored in the Frame Buffer '0' at 634, is of low quality, and is associated with a base layer decoder 95. The second reference is stored in the Frame Buffer '1' at 652, is of high quality, and is associated with an enhancement layer decoder 97. Only the low quality reference is allowed in reconstruct the base layer in order to assure no drifting error at this layer. Base layer decoder 95 is the same as that of baseline FGS, which can be compatible to other standards, such as MPEG-2 and H.263.

The enhancement layer can use the two different quality references for reconstruction. The enhancement bitstream is first decoded using bit-plane Varible Length Decoder (VLD) and mode VLD. The bit planes at the enhancement layer are categorized into lower enhancement layer and higher enhancement layer. Only the bit planes at the lower enhancement layer are used to reconstruct the high quality reference. In FIG. 10 at Bit-Plane VLD 641, n(t) is the number of bit planes at the lower enhancement layer, and m(t) is the number of additional bit planes for reconstruction of the display frame.

VLD module 620 decodes the bit stream for the base layer to recover the quantized low quality coefficients. Motion vectors (MVs) from the decoding at VLD module 620 are passed to motion compensators 622 and 624. These coefficients are dequantized by a dequantizer (i.e., the "$Q^{-1}$" module) 626 and then passed through an inverse DCT (IDCT) transform 628 to reconstruct the base layer. The reconstructed base layer is summed via summation 630 with a predicted base layer from the motion compensator 622, clipped by clipping module 632, and output. The reconstructed base layer is also stored in frame buffer '0' at 634.

The encoded lower and higher enhancement layer bit-streams are input into enhancement layer decoder 97 at a bit-pane VLD 641 and at a mode VLD 600. Bit-plane VLD 641 splits the result and forwards same to two respective bit-pane shifts 640, 670. Residue modules 642, 672 combine the result from bit-pane shifts 640, 670, and with the dequantized coefficients from $Q^{-1}$ module 626, for input to IDCT transformers 644, 674, respectively. IDCT transformers 644, 674 input to residual modules 646, 676, respectively, for summation. Predictive images from MC modules 622, 624 can be summed at residual modules 646, 676 with the result of IDCT transformers 644, 674 prior to clipping operations at respective clipping modules 650, 678, depending upon the settings of respective switches 648, 649. Video can then be output from clipping modules 650, 678, although output from clipping module 650 is optional.

Drifting Error Analysis and Modeling

An analysis and modeling of drifting error will now be presented in reference to the encoding function as seen in FIG. 9. The effects of errors that are introduced to the high quality references in the decoder in the simple case and the general case will be discussed respectively below.

1. The Drifting Errors in the Simple Case

Firstly, consider the simple case only. There are N frames in a Group Of Picture (GOP), and all low enhancement layers in first n−1 frames are correctly transmitted to the decoder. But in the $n^{th}$ frame, part of DCT coefficients in the low enhancement layer is dropped during transmission. In this case, the decoded high quality reference is $$\hat{r}_e(n) = \hat{p}_e(n) + f^{-1}(\hat{X}_b(n) + \hat{X}_l(n)). \quad (1)$$

Here $\hat{r}_e(n)$ denotes the decoded high quality reference in the $n^{th}$ frame, and $\hat{p}_e(n)$ denotes the high quality temporal prediction used in the decoder. $\hat{X}_b(n)$ and $\hat{X}_l(n)$ are decoded DCT coefficients in the base layer and low enhancement layer, respectively. Function $f^{-1}(*)$ is the inverse DCT transform. However, the corresponding high quality reference $r_e(n)$ reconstructed in the encoder is $$r_e(n) = p_e(n) + f^{-1}(\tilde{X}_b(n) + \tilde{X}_l(n)), \quad (2)$$

where FIG. 9 shows $r_e$ as the output of residual module 554, $p_e$ is the output of MC 558, dequantizer module $Q^{-1}{}_b$ at 528 forms reconstructed base layer DCT coefficients $\tilde{X}_b$ at 528, and dequantizer module $Q^{-1}_L$ at 568 forms reconstructed lower enhancement layer DCT coefficients $\tilde{X}_l$.

Here $\hat{X}_b(n)$ and $\hat{X}_l(n)$ denote the reconstructed DCT coefficients in the base layer and low enhancement layer, respectively. And $p_e(n)$ is the high quality temporal prediction used in the encoder. Since all low enhancement layers in the first n-1 frames are correctly transmitted to the decoder, $\hat{p}_e(n)$ is equal to $p_e(n)$. Furthermore, the decoded DCT coefficient $\hat{X}_b(n)$ is equal to the reconstructed DCT coefficient $\tilde{X}_b(n)$, because it is always assumed that the base layer can be correctly transmitted to the decoder with error protection techniques. With the decoded DCT coefficient $\hat{X}_l(n)$ does not equal $\tilde{X}_l(n)$ due to transmission corruptions. Since the linear property of the DCT transform, the difference between the two high quality references caused by the corrupted low enhancement layer can be described as $$e_e(n) = f^{-1}(\tilde{X}_l(n) - \hat{X}_l(n)). \quad (3)$$

Obviously, if the low enhancement layer in the $n^{th}$ frame is correctly transmitted to the decoder, the difference $e_e(n)$ is zero. If the whole low enhancement layer is dropped during transmission, the difference $e_e(n)$ is the maximum value $f^{-1}(\tilde{X}_l(n))$. The difference $e_e(n)$ not only could affect the decoded quality of the current frame, but also could propagate to other frames followed within the same GOP. Because of the motion prediction loop in the PFGS scheme, the decoded high quality reference $\hat{r}_e(n)$ in the $n^{th}$ frame will form the next prediction through motion compensation. Thus, the next high quality temporal prediction in the decoder is $$\hat{p}_e(n+1) = g_{n+1}(\hat{r}_e(n)) \quad (4)$$

Here $g(*)$ denotes the motion compensation. The subscript "n+1" indicates the motion vectors of the $(n+1)^{th}$ frame are used in this motion compensation process. Similarly, the corresponding prediction in the $(n+1)^{th}$ frame in the encoder derives from the reconstructed high quality reference $r_e(n)$ $$p_e(n+1) = g_{n+1}(r_e(n)). \quad (5)$$

Because of the difference between $r_e(n)$ and $\hat{r}_e(n)$, the temporal prediction $\hat{p}_e(n+1)$ is also different from $p_e(n+1)$. Even though the low enhancement layer in the $(n+1)^{th}$ frame is correctly transmitted to the decoder, the decoded high quality reference still has some errors in this frame due to the error high quality prediction. The errors propagated from the $n^{th}$ frame can be represented as $$y(n+1) = p_e(n+1) - \hat{p}_e(n+1) \quad (6)$$
$$= g_{n+1}(p_e(n) + f^{-1}(\tilde{X}_b(n) + \tilde{X}_l(n))) -$$
$$g_{n+1}(\hat{p}_e(n) + f^{-1}(\hat{X}_b(n) + \hat{X}_l(n))).$$

Since motion vectors are encoded and transmitted with base layer together, it can be assumed that motion information is the same in the encoder and decoder. With the same motion vectors, the motion compensation essentially is a 2D shifting transform. In other words, the motion compensation of two signals should be equal to the sum of each signal after motion compensation. With the linear DCT transform, Equation (6) can be simplified as $$y(n+1) = g_{n+1}(f^{-1}(\tilde{X}_l(n) - \hat{X}_l(n))). \quad (7)$$

Equation (7) shows that the errors in the low enhancement layer in the $n^{th}$ frame can affect the quality of the $(n+1)^{th}$ frame. In fact, this error can affect all frames followed in this GOP through motion compensation. With the same method, the effect of these errors to the $(n+k)^{th}$ frame can be described as $$y_n(n+k) = g_{n+k}(\ldots(g_{n+1}(f^{-1}(\tilde{X}_l(n) - \hat{X}_l(n))))). \quad (8)$$

Equation (8) makes clear that the error propagation is accomplished through motion compensation. Within the same GOP, the errors occurred in the $n^{th}$ frame is propagated to the $(n+k)^{th}$ frame through k motion compensations.

2. The Drifting Errors in the General Case

Consider the general case. The first frame is encoded as an I frame, and other frames are encoded as P frames. The bidirectional or B frame case is excluded from the present consideration, because it cannot cause the drifting error. In real applications, the low enhancement layer of each frame may be corrupted by packet losses or transmission errors. In other words, each frame may contribute some new errors to the drifting error due to the transmission corruptions in its low enhancement layer. All errors in the low enhancement layers can be propagated within this GOP. Therefore, the drifting error appeared in the $n^{th}$ frame is an accumulative error propagated from the previous frames. It can be represented as $$y(n) = \sum_{k=1}^{n-1} y_k(n). \quad (9)$$

Here $y_k(n)$ denotes the effect of errors occurred in the $k^{th}$ frame to the current frame. Combining Equations (8) and (3) with the above Equation (9), the obtained result is $$y(n) = \sum_{k=1}^{n-1} g_n(\ldots(g_{k+1}(e_e(k)))). \quad (10)$$

Here $e_e(k)$ denotes the error signal occurred in the low enhancement layer in the $k^{th}$ frame. If the low enhancement layers in successive frames are not correctly transmitted to the decoder, the drifting errors appeared in the frames followed can be described with Equation (10). This clearly explains why the drifting error can rapidly deteriorate the decoded video quality up to 2.0 dB in the PFGS scheme. If Equation (10) is directly applied to estimate the drifting errors in the encoder, the computational complexity is $O(n^2)$. In order to calculate the accumulative drifting errors in the $n^{th}$ frame, there are $n \times (n-1)/2$ motion compensations and $n-1$ inverse DCT transforms needed.

Recalled the calculating process in Equation (10), the error signal occurred in the previous each frame is first warped to the current frame through one or multiple motion compensations and then is accumulated. In other words, the same motion compensation is performed multiple times to propagate each error signal from one frame to the next frame. In fact, since the same motion vectors are used in this process, all error signals from the previous frames can be first added together and then be propagated to the next frame through one motion compensation. Therefore, an iterative model is applied to concisely describe the drifting error $$y(n) = \begin{cases} 0 & n = 1 \\ g_n(y(n-1) + e_e(n-1)) & N \geq n > 1. \end{cases} \quad (11)$$

Where N is the total number of frame in this GOP. y(n-1) is the drifting error propagated from the previous frames to the $(n-1)^{th}$ frame. $e_e(n-1)$ is the error occurred in the low enhancement layer in the $(n-1)^{th}$ frame. With the motion compensation, their sum forms the new drifting error in the $n^{th}$ frame. It is clear that utilizing Equation (11) to model the drifting error in the encoder is further simple. The additional complexity is one motion compensation and one inverse DCT transform in each frame. Moreover, the extra computation is only needed in the encoder.

If the encoder can exactly get the corrupted information about the low enhancement layers from the decoder, the iterative drifting model can reproduce the drifting error originally occurred in the decoder. In other words, an up-link channel is first needed to transmit the feedback to the encoder for those bit planes and macroblocks that could not be decoded successfully. With the drifting model the encoder can immediately calculate the drifting error in each frame to real-time control its coding process. However, in most of streaming video applications, the encoder usually compresses video sequences into bit-streams in advance and prestores them in the server. Although the server can get feedback from the receivers, it cannot control the coding process. Therefore, in the PFGS scheme the iterative drifting model is applied to estimate the drifting error in the worst case. The worst case means that all low enhancement layers in the first (n-1) frames are completely dropped during transmission, and the decoder obtains the enhancement layer in the $n^{th}$ frame again. So the error occurred in the low enhancement layer of each frame are always maximum, i.e., the whole DCT coefficients encoded in the low enhancement layer.

Macroblock-Base Drifting Reduction

The analyses in the previous section make clear that the reason causing the drifting errors is the losses and errors in the low enhancement layer. Moreover, an iterative model is able to accurately simulate the drifting errors in the encoder. The subsequent problem is how to effectively reduce the drifting errors in the PFGS scheme. This section analyzes the error reduction technique proposed in the Wu et al. Publications based on the drifting model, and then extends this technique at the macroblock level. Since there are two references used in the PFGS scheme, three INTER modes are proposed for the enhancement macroblock coding, which offer a flexible and effective method to reduce the drifting errors.

1. The Effective Error Reduction Technique

From the iterative drifting model, the drifting errors in the high quality reference in the $n^{th}$ frame consist of two parts: the error y(n) propagated from the previous frames and the error $e_e(n)$ caused by the transmitted corruptions in the current low enhancement layer. In general, the error occurred in the individual low enhancement layer is relative small. However, the errors y(n) propagated from the previous frames sometimes become much large due to the error accumulation in multiple frames. If the error y(n) is larger than the given threshold, this means the errors propagated from the previous frames already significantly affects the current decoded quality. If the current frame continues to encode with normal method, the error y(n) plus the new error $e_e(n)$ will cause a further large drifting error in the next frame.

In order to prevent the drifting error in one frame from propagating to other frames, the key point here is to make sure that the encoder and decoder have the same reconstructed high quality references for any future frame prediction. Since the low quality references obtained in the encoder and decoder are always same in the PFGS scheme, utilizing the low quality reference to reduce the drifting error would is more effective than the INTRA refresh method. If the error y(n) estimated by the drifting model is larger than the given threshold, even though the enhancement layer is predicted from the previous high quality reference, the encoder still reconstructs the high quality reference from the previous low quality prediction. By doing such, the reconstructed high quality reference in the encoder becomes $$r'_e(n) = p_b(n) + f^{-1}(\tilde{X}_b(n) + \tilde{X}_l(n)). \quad (12)$$

Here $p_b(n)$ denotes the previous low quality prediction. Compared with (2), the difference is the low quality prediction instead of the high quality prediction. Similarly, the decoder also reconstructs the high quality reference from the low quality prediction in this case.

$$\hat{r}'_e(n) = \hat{p}_b(n) + f^{-1}(\hat{X}_b(n) + \hat{X}_l(n)) \quad (13)$$

Since $\hat{p}_b(n)$ is always equal to $p_b(n)$, i.e., the same temporal prediction are used in the encoder and the decoder, the error propagates from the $n^{th}$ frame to the next frame now becomes as $$y'(n+1) = g_{n+1}(f^{-1}(\tilde{X}_l(n) - \hat{X}_l(n))) = g_{n+1}(e_e(n)) \quad (14)$$

Different from the iterative drifting model, the above Equation shows that reconstructing the high quality reference from the previous low quality prediction can completely eliminate the error y(n) propagated from the previous frames. In other words, only the error caused by the current low enhancement layer can be propagated to other frames followed. Therefore, the error propagation occurred in the PFGS scheme can be effectively reduced with this technique.

In fact, when the high quality reference is reconstructed from the previous low quality prediction, consequently it suffers some losses in quality, because it cannot obtain the best prediction it could get. The quality loss in the high quality reference is equal to the difference between two temporal predictions $$r_e(n) - r'_e(n) = p_e(n) - p_b(n) \quad (15)$$

The current low quality prediction is equal to the accumulation of DCT coefficients encoded in all previous base layers through motion compensation, whereas the current high quality prediction is the accumulation of DCT coefficients encoded in all previous base layers and low enhancement layers. In the PFGS scheme, the iterative drifting model is applied to calculate the drifting error in the worst case, i.e., all low enhancement layers are completely dropped in the previous frames. The error y(n) in the iterative model essentially is the accumulation of DCT coefficients encoded in all previous low enhancement layers. In other words, the current high quality prediction equals the sum of y(n) and $p_b(n)$ in this case. Therefore, the quality loss in Equation (15) can be represented as $$r_e(n) - r'_e(n) = y(n). \quad (16)$$

The above Equation shows, with the error reduction technique, the drifting error occurred between the encoder and the decoder is now transferred to the reconstructed high quality reference at the encoder. With the quality losses in the reconstructed high quality reference, the temporal prediction for the next frame also has the corresponding losses. This means that more bits are needed to encode the predicted residues in the next frame. Therefore, this method also affects the coding efficiency of the PFGS scheme. However, with the estimated information of the drifting model, when the enhancement layer is predicted from the high quality reference, reasonably utilizing the above error reduction at the macroblock level still possibly provides a good trade-off between low drifting error and high coding efficiency.

Although the proposed drifting reduction ultimately encodes the drifting errors to the enhancement layer, the proposed method still has some obvious advantages compared with the addition drifting correction method. Firstly, the drifting error is introduced to the enhancement layer coding through the high quality reference. There is not an extra encoder needed to compress the drifting errors. Secondly, only the enhancement bit-stream is generated in the proposed method, the server does not need to make a decision in transmitting either the enhancement bit-stream or the drifting correction bit-stream. Finally, integrating the drifting errors into the enhancement layer coding can further effectively compress the drifting errors than the separate method, because the separate method needs to deal with more run lengths in the VLC coding.

2. Inter Modes for the Enhancement Macroblock Coding

Obviously, if the above error reduction technique is applied at the frame level, the PFGS scheme has to periodically reconstruct the whole high quality reference from the previous low quality prediction. It is very difficult for the PFGS scheme to achieve a good trade-off between high coding efficiency and low drifting errors. Therefore, this paper extends the error reduction method at the macroblock level. Since two references are used in the PFGS scheme, each enhancement macroblock has more flexibility in choosing its references for prediction and reconstruction. In other words, it can be predicted/reconstructed from either low quality reference or high quality reference.

Figure 11:
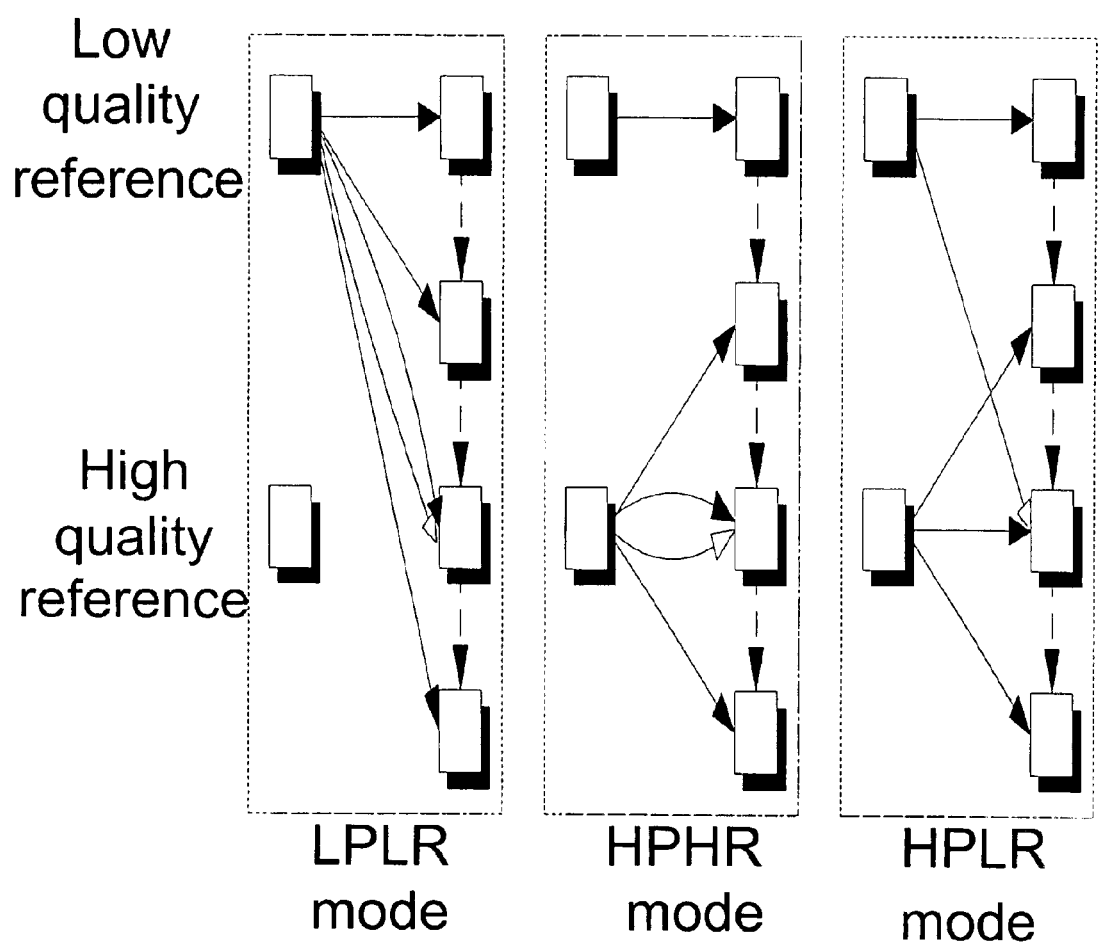
FIG. 11 is a diagrammatic illustration of a layered coding scheme that shows three video coding schemes used to reduce drifting error in accordance with the flow diagrams of FIGS. 13–14.

FIG. 11 illustrates the INTER modes for the enhancement macroblock coding. Three INTER modes for the enhancement layer macroblock coding are depicted in FIG. 11. Gray rectangular boxes denote those layers to be reconstructed as references. Solid arrowheads with solid lines are for temporal predictions, hollow arrowheads with solid lines are for reconstruction of high quality references, and solid arrowheads with dashed lines are for predictions in DCT domain. The distinctions among three INTER modes are different references used for prediction and reconstruction of the enhancement layer.

In the LPLR mode, the enhancement macroblock is predicted from the previous low quality reference, and the high quality reference for the next frame is reconstructed from the same reference. There is no drifting error in this mode, because the low quality references are always available in the decoder. If all enhancement macroblocks are encoded with this mode, the PFGS scheme is exactly same as the FGS scheme. The coding efficiency of this mode is low due to low quality temporal prediction.

In the HPHR mode, the enhancement macroblock is predicted from the previous high quality reference and reconstructed from the same reference. This mode can provide high coding efficiency. If all enhancement macroblocks are encoded with this mode, the PFGS scheme can provide the highest coding efficiency at high bit rates. But, if the high quality reference in the previous frame is not available due to network bandwidth or transmission errors in the previous frames, the decoder has to use the low quality reference instead. This would cause the drifting error.

The HPLR mode is the extension of the error reduction method at the macroblock level. In this mode, the enhancement macroblock is predicted from the previous high quality reference. However, the high quality reference is reconstructed from the previous low quality reference at both of the encoder and decoder. Since the encoder and decoder can always obtain the same temporal prediction, the error y(n) propagated from the previous frames can be effectively eliminated in this mode. One distinct feature of this mode is that the reference for prediction differs from the reference for reconstruction.

Although multiple coding modes provide a possible method to effectively reduce the drifting error in the PFGS scheme, how to optimally choose the coding mode for each enhancement macroblock is another problem needed to solve.

Decision Mechanisms for Macroblock Coding

Figure 13:
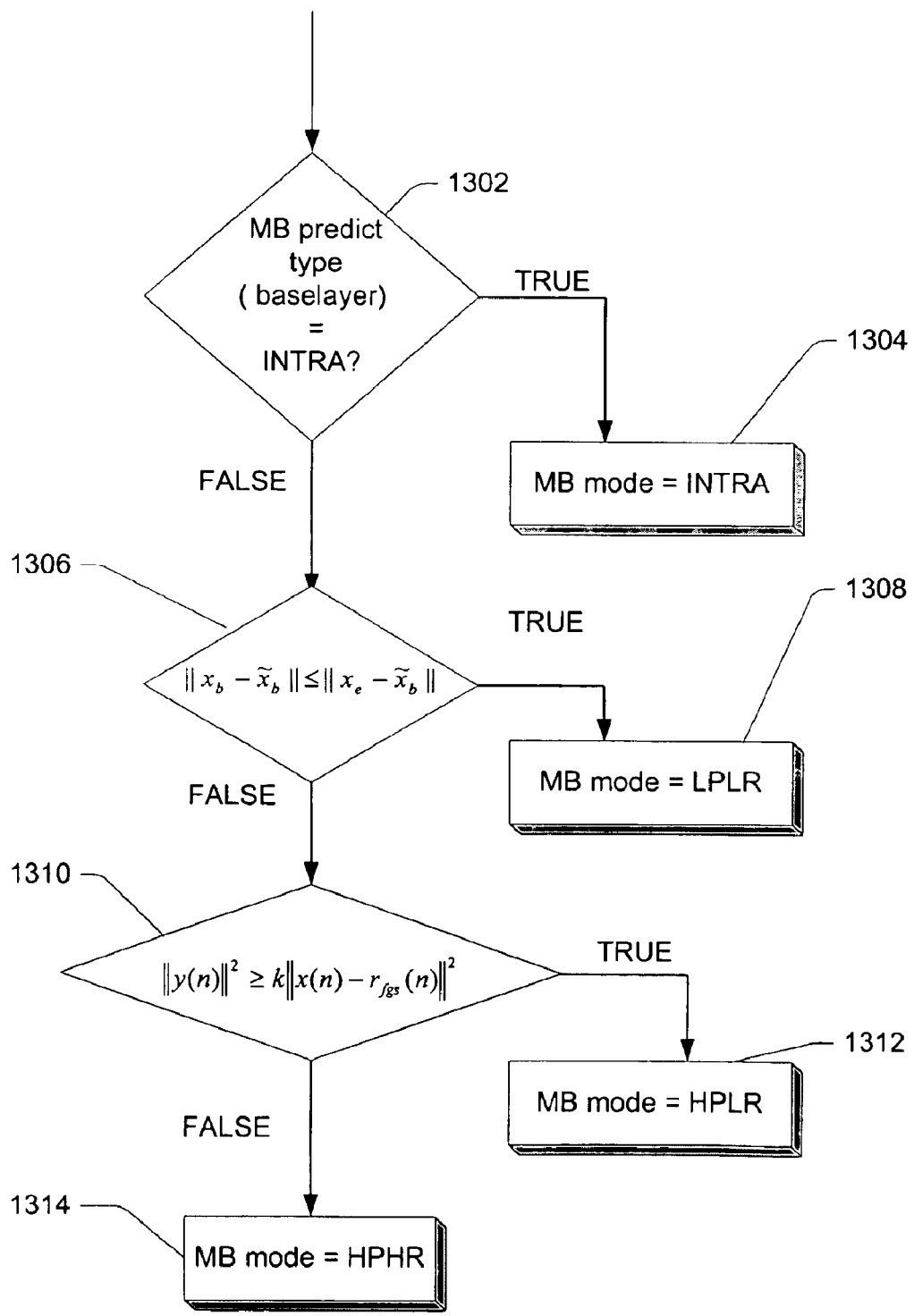
FIGS. 13–14 are flow diagrams showing, respectively, a simple and complex method for encoding video data using a layered coding scheme so as to reduce drifting error.
Figure 14:
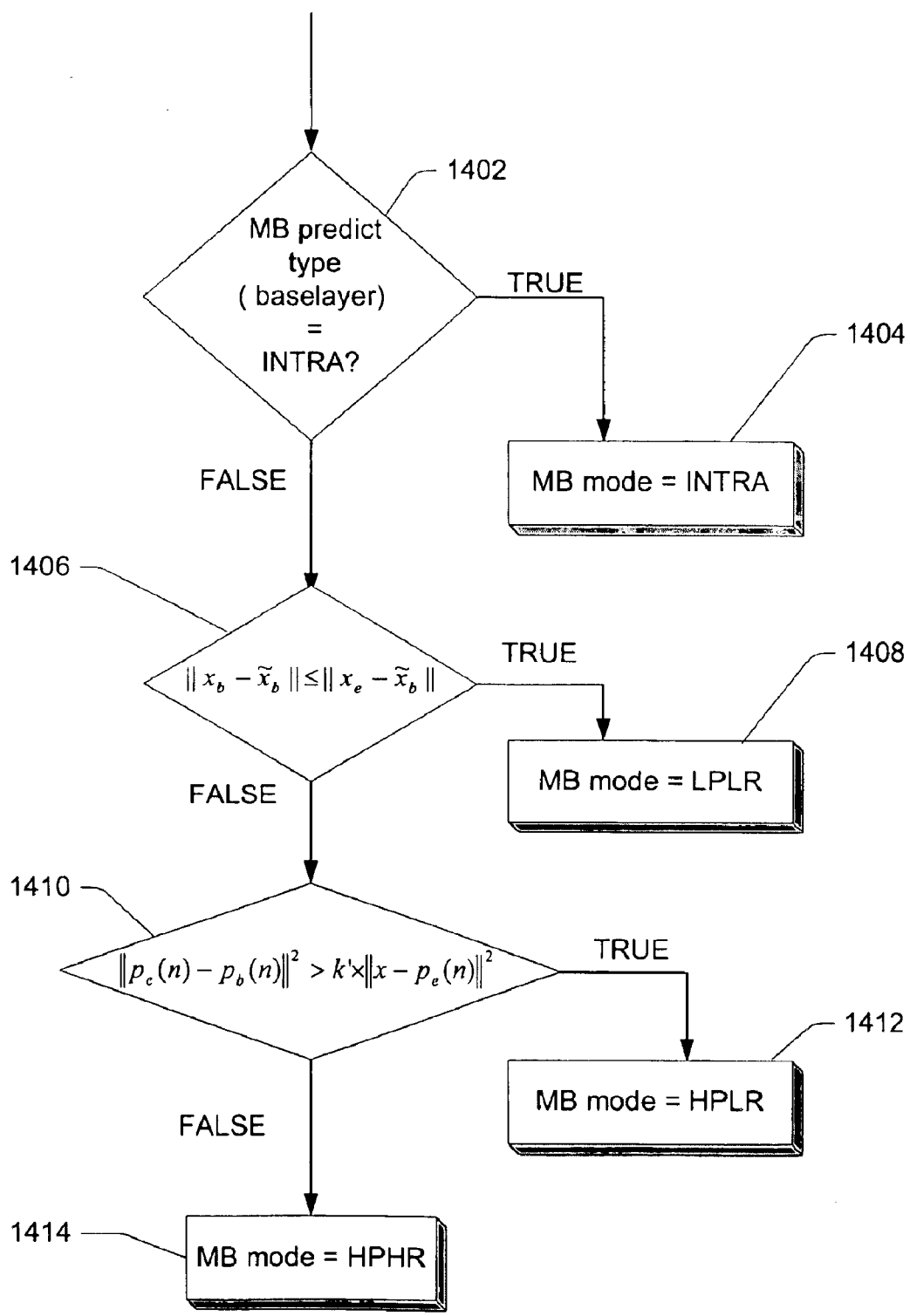

In this section, in reference to FIGS. 13–14, a discussion is had of the decision-making mechanism for controlling the PFGS coding at the macroblock level. The flowcharts seen in FIGS. 13–14 depict the method for macroblock encoding with both the INTRA and INTER modes and will be made reference to in the discussion of the formulas presented below.

In the traditional coding scheme, each macroblock can be alternatively encoded with either the INTRA mode or the INTER mode. The first frame of each GOP is always encoded with the INTRA mode, as depicted in each of FIGS. 13–14 at reference numerals 1302–1304 and 1402–1404, respectively. In the predicted frames, the motion estimation module decides the coding mode of each macroblock between the INTRA mode and the INTER mode. In general, only small part of macroblocks is encoded with the INTRA mode in the region of full motion compensation.

Since there are two references in PFGS coding scheme, there are four coding modes are used in the enhancement macroblock coding besides the INTRA mode. The decision-making mechanism will choose the coding mode of each enhancement macroblock among the four modes. This paper has developed two decision-making mechanisms. Firstly, a decision-making mechanism is proposed fully based on the iterative drifting model, which can accurately control the drifting error in the PFGS scheme. Secondly, a simplified decision-making mechanism based on temporal predictions is also proposed to choose the coding mode for each enhancement macroblock.

1. The Decision-Making Mechanism Based on the Drifting Mode

The decision-making mechanism is a necessary component in the macroblock-based PFGS scheme, which can optimally choose the coding mode of each enhancement macroblock. Besides three INTER modes, the INTRA mode is also allowed in the enhancement layer coding. The INTRA mode or the INTER modes are determined by the motion estimation module just as in the traditional coding scheme. If one macroblock in the base layer is encoded with the INTRA mode, the enhancement macroblock at the same location is also encoded using the INTRA mode without any temporal prediction. The quantization residues of the base layer directly form the enhancement bit-stream with the bit plane technique. If a macroblock in the base layer is encoded with the INTER mode, the decision-making mechanism has to determine which INTER mode should be used in the corresponding enhancement macroblock.

The reference for prediction in the LPLR mode is of low quality, but the references used in the HPHR and HPLR mode are of high quality. Therefore, the criterion to distinguish the LPLR mode from the other two INTER modes can be expressed as:

$$\min(\|X_b-\tilde{X}_b\|, \|X_e-\tilde{X}_b\|) \text{ or as } \|x_b-\tilde{x}_b\| \leq \|x_e-\tilde{x}_b\| \qquad (17)$$

As such, FIGS. 13–14 show decision blocks 1306 and 1406, respectively, at which the LPLR macroblock coding mode can be selected on the basis of the truth of Equation (17). In other words, if the enhancement layer is predicted from the low quality reference, the DCT residues encoded in the enhancement layer are $X_b-\tilde{X}_b$, otherwise the DCT residues encoded in the enhancement layer are $X_e-\tilde{X}_b$. Thus, when the absolute mean of the former DCT residues is less than that of the latter DCT residues as determined at step 1306 or 1406, the current macroblock should be encoded using the LPLR mode as seen at steps 1308 and 1408; otherwise the decision-making mechanism further determines the coding mode between the HPHR and HPLR mode as determined at steps 1310 and 1410, which are discussed below. In reference to FIG. 9, $\tilde{x}_b$ is the output of IDC module 520, $x_b$ is the output of residue module 520, and $x_e$ is the output of residual module 560. $\tilde{X}_b$ is the reconstructed base layer DCT coefficients output of dequantizer module $Q^{-1}{}_b$ at 528, DCT module 522 outputs DCT coefficients $X_b$, and DCT module 562 forms DCT coefficients $X_e$ for the enhancement layer.

The key part of the decision-making mechanism is how to determine the coding mode between the late two modes. Both the HPHR mode and the HPLR mode are predicted from the high quality reference, but the difference between them is the references used for reconstruction. In the HPHR mode, the high quality reference is reconstructed from the previous high quality reference, whereas in the HPLR mode the high quality reference is reconstructed from the previous low quality reference. Since the HPHR mode can provide high coding efficiency, most of enhancement macroblocks should be encoded with this mode. But, too many enhancement macroblocks encoded with the HPHR mode also could cause the drifting errors at lower enhancement bit rates.

Figure 12:
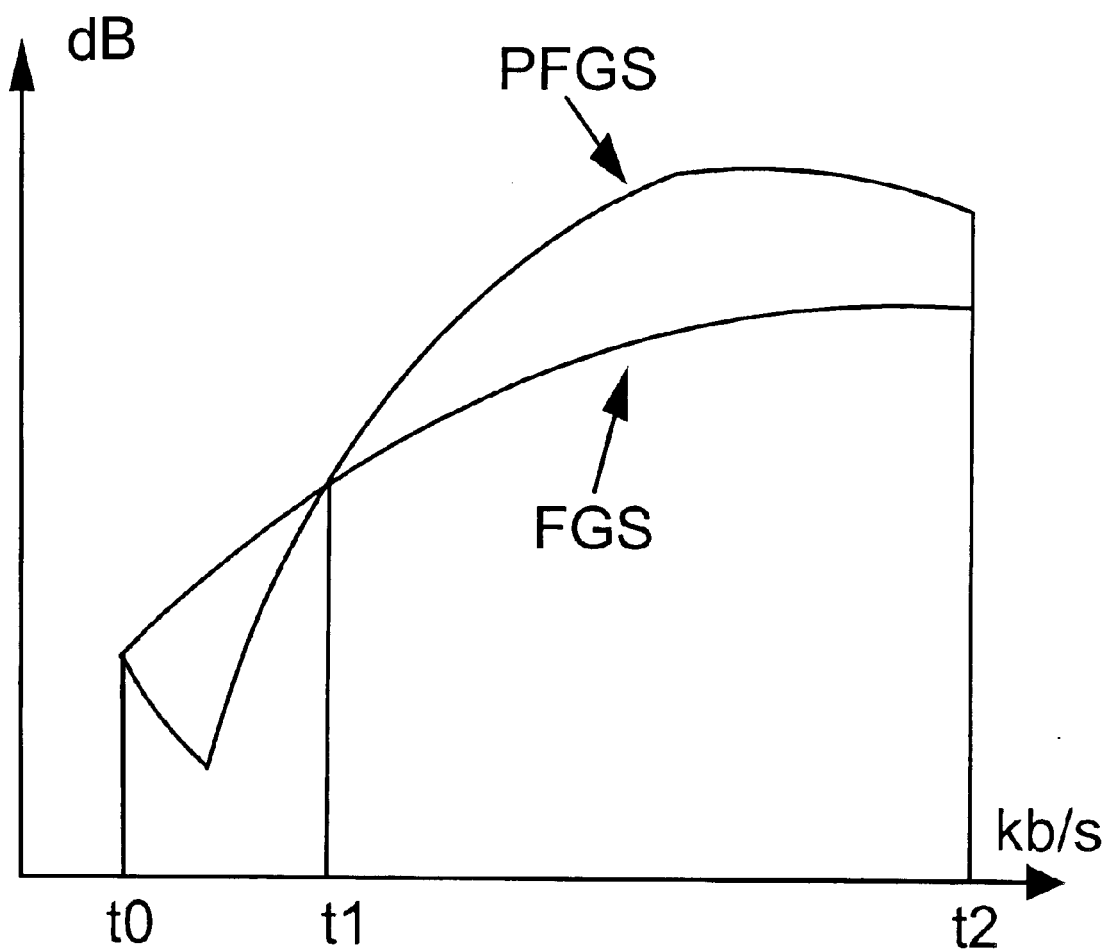
FIG. 12 is graph illustrating, for both PFGS and FGS video coding, the relationship between peak signal to noise ratio (db) versus bandwidth (kb/s), and particularly showing the drifting phenomenon.

If all macroblocks are encoded with the HPHR mode, the typically curve of PSNR versus bit rate of the PFGS scheme is given in FIG. 12. The decoded quality of the base layer between the FGS scheme and the PFGS scheme is exactly same. At low enhancement bit rates, since high quality references aren't available, the decoded quality of the PFGS scheme is significant lower than that of the FGS scheme due to the drifting error. With the bit rate increasing, the high quality reference is gradually available in the decoder. Once the bit rate is enough high to transmit the whole low enhancement layer to the decoder, the decoded quality of the PFGS scheme is significant higher than that of the FGS scheme. The decision-making mechanism should optimally choose the coding mode between the HPHR mode and the HPLR mode to reduce the quality losses at low bit rates, meanwhile maintaining the high coding efficiency at moderate or high bit rates. Therefore, the ideal criterion for choosing the coding mode should be $$\max_{\text{mode}\in\{HPHR,HPLR\}}\left(\int_{t1}^{t2}\|\hat{x}_{pfgs}(t)-\hat{x}_{fgs}(t)\|^2 dt - \lambda\int_{t0}^{t1}\|\hat{x}_{fgs}(t)-\hat{x}_{pfgs}(t)\|^2 dt\right); \qquad (18)$$

where $\hat{x}_{pfgs}$ and $\hat{x}_{fgs}$ are the decoded sequences at the bit rate t, where t0 and t2 are the bit rate of the base layer and the highest bit rate of the enhancement layer, respectively, where t1 is the bit rate at which the decoded quality of the PFGS scheme equals that of the FGS scheme, and where λ is the weighting factor. The first item in (18) denotes the coding efficiency gain at the high bit rates, and the second item denotes the coding efficiency loss at the low bit rates.

FIG. 12 illustrates the PSNR curve of the PFGS scheme compared with that of the FGS scheme. Obviously, the criterion given in (18) is a computational intensive process. It is impossible to use this criterion to determine the coding mode in actual applications. Therefore, the decision-making mechanism adopts the method by constraining the quality losses at low bit rates as the new criterion, i.e. minimizing the second item of Equation (18). Since the drifting error are occurred and propagated in the high quality references, the decision-making mechanism uses the reconstructed high quality reference instead of the decoded image in the new criterion. The video quality of the FGS scheme is used as the reference to measure the drifting errors. In the FGS scheme, all enhancement macroblocks are encoded with the LPLR mode. As long as the previous base layer is available, the current layer can be correctly decoded until the highest bit plane. The PFGS encoder can easily calculate the reconstructed high quality reference in the FGS scheme $$r_{fgs}(n)=p_b(n)+f^{-1}(\tilde{X}_b(n)+\tilde{X}'_l(n)), \qquad (19)$$

where $\tilde{X}'_l(n)=Q(X_b(n)-\tilde{X}_b(n))$.

In the FGS scheme, the DCT coefficients encoded in the low enhancement layer are the residues between $X_b(n)$ and the reconstructed $\tilde{X}_b(n)$. These DCT residues are already available in the PFGS encoder for determining the LPLR mode.

Since the PFGS scheme uses the drifting model to estimate the drifting error in the worst case. In this case, when the high quality reference is available, the quality loss in the decoded image is equal to the estimated drifting error y(n). Therefore, the criterion expects to constrain the drifting error within the given range relative to the mean square error of the FGS decoded image $$\|y(n)\|^2 \geq k\|x(n)-r_{fgs}(n)\|^2, \qquad (20)$$

where Equation (20) is seen in FIG. 13 at decision block 1310. If Equation (20) is true, the enhancement macroblock will be encoded using the HPLR mode at step 1312, otherwise the enhancement macroblock will be encoded using the HPHR mode at step 1314. The factor k is an adjustable parameter. When the above criterion is true, this macroblock is encoded with the HPLR mode; otherwise this macroblock is encoded with the HPHR mode. Equation (20) is seen in the flowchart of FIG. 13.

It is clear that the above decision-making mechanism is a computational intensive method. In order to calculate the drifting error in the worst case, there is one motion compensation and one IDCT transform needed. Moreover, another IDCT transform is needed to reconstruct the high quality reference of the FGS scheme.

2. The Simplified Decision-Making Mechanism

In most applications, accurately calculating the drifting error in the worst case is not necessary. A rough estimation is normally good enough. Therefore, a simplified decision-making mechanism is developed based on the two temporal predictions of each frame. Compared with the previous decision-making mechanism, the criterions for the INTRA mode and the LPLR mode is exactly same, the difference is that a simplified criterion is used for distinguishing the HPHR mode from the HPLR mode.

Form the iterative drifting model, the real reason causing the drifting errors is that the lower enhancement layers are dropped or corrupted during transmission. The drifting model estimates the drifting errors by accumulating all errors in the previous low enhancement layers. However, a simplified method is to only consider the errors in the previous low enhancement layer just as the simple case discussed in the section [0089]. In this case, assume that all low enhancement layers in previous n-2 frames are correctly transmitted to the decoder, the error only occurs in the $(n-1)^{th}$ low enhancement layer. The worst case is the low enhancement layer in the $(n-1)^{th}$ frame is completely dropped. Therefore, the drifting error in the current frame is equal to the difference between two temporal predictions.

Obviously, the larger the difference is between two temporal predictions, the larger the quality loss will be caused when the previous high quality reference is not available. In order to control the possible quality loss, the decision-making mechanism defines a criterion as follows, $$\|p_e(n)-p_b(n)\|^2 > k \times \|x_o - r_e(n)\|^2. \quad (21)$$

Here $x_o$ is the current original image. Similarly, the factor k is an adjustable parameter, which controls the performance of the PFGS scheme at low bit rates and high bit rates. $\|x_o - r_e(n)\|^2$ is the mean squared error of the reconstructed high quality reference. When the difference between two temporal predictions is smaller than the left-hand side value of Equation (21), this macroblock should be encoded with the HPLR mode, since otherwise coding it with the HPHR mode will cause a significant drifting error. But the coding mode of each macroblock is determined before coding process, $r_e(n)$ in Equation (21) is generally not available. Therefore, the following criterion is applied to approximate Equation (21):

$$\|p_e(n)-p_b(n)\|^2 > k' \times \|x - p_e(n)\|^2, \quad (22)$$

where Equation (22) is seen in FIG. 14 at decision block 1410. Referring to FIG. 9, the original image x is seen at 500, $p_b$ is seen at MC 536, and $p_e$ is seen after MC 558.

If Equation (22) is true, the enhancement macroblock will be encoded using the HPLR mode at step 1412, otherwise the enhancement macroblock will be encoded using the HPHR mode at step 1414. The factor k is an adjustable parameter. When the above criterion is true, this macroblock is encoded with the HPLR mode; otherwise this macroblock is encoded with the HPHR mode, where $r_e(n)$ is replaced by $p_e(n)$.

Since two temporal predictions in Equation (22) are already available, no additional computation is introduced to the PFGS encoder. The criterion given in Equation (22) only considers the effect of the difference between two temporal predictions in individual frames 'n'. Due to the propagation and accumulation of such a difference, even a small difference between two temporal predictions in successive frames may cause a large drifting error in the end. For this reason, another limitation is applied to make sure that the macroblocks at the same location cannot be continuously encoded with the HPHR mode over a certain number of frames. It is clear that the proposed decision-making mechanism can be easily implemented to control the PFGS scheme.

The coding mode information of each macroblock should be included in the macroblock header. Since the base layer bit-stream already provides the information about the INTRA mode, only the INTER mode information needs to be encoded in the enhancement bit-stream. A simple VLC table is used to compress them into the enhancement bit-stream.

Other Coding Modes for the Enhancement Macroblock

In the three INTER modes discussed in the previous section, the base layer is always predicted and reconstructed from the low quality reference in order to avoid the drifting errors in the base layer. In fact, the base layer also is allowed to predict and reconstruct from the high quality reference. Other extensive coding modes can be applied in the PFGS scheme as well, as seen in FIGS. 15–18 and are discussed below. As such, the choice of a macroblock encoding and decoding technique for the INTER coding modes, as described with respect to step 152 in FIG. 8 for encoder 80 of FIGS. 5 and 9, and for step 164 in FIG. 8 for decoder 98 of FIGS. 5 and 10, is also applicable to the coding modes of FIGS. 15–18.

Figure 15:
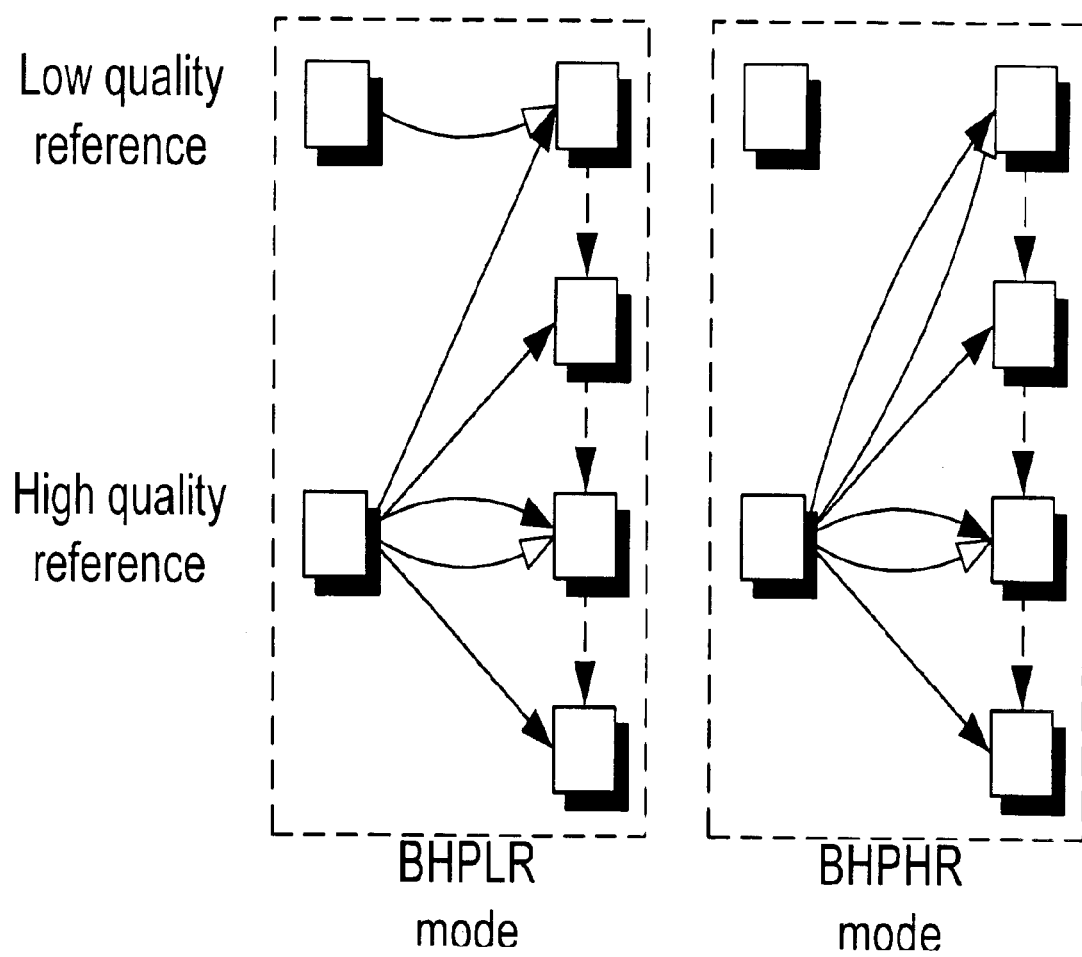
FIG. 15 is a diagrammatic illustration of a layered coding scheme that shows two additional video coding schemes for the enhancement macroblock in the P frame that are used to reduce drifting error.

In FIG. 15, two extensive modes are given for the P frame. In the BHPLR mode, the base layer is predicted from the high quality reference, and is reconstructed from the low quality reference just as the error reduction method. This mode will not cause the drifting error in the base layer. In the BHPHR mode, the base layer is predicted and reconstructed from the same reference, i.e., the high quality reference. Once the high quality reference is not available in the decoder, this mode will cause the drifting error in the base layer. Therefore, when the BHPHR mode is applied to the PFGS scheme, the INTPA mode has to be used in the base layer to reduce the drifting error. At the same time, the corresponding drifting model and decision-making mechanism are needed in the base layer.

Figure 16:
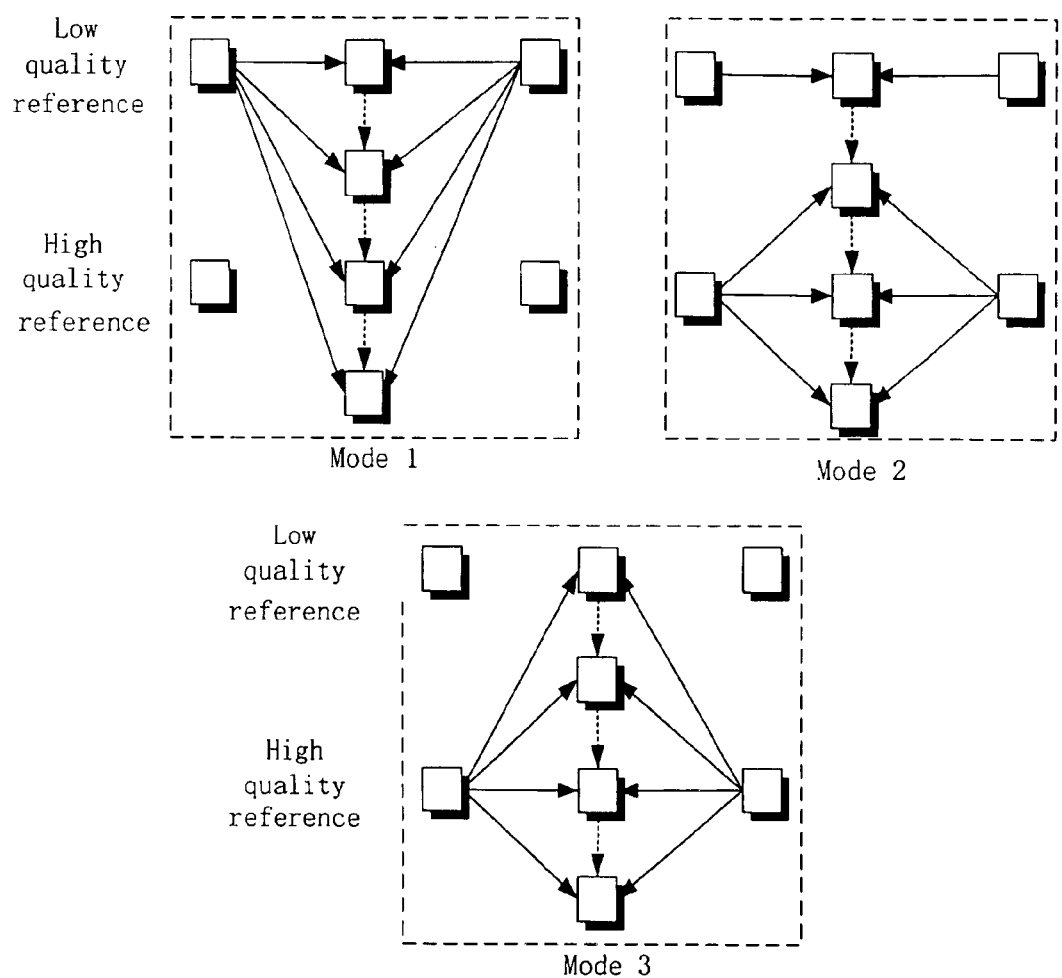
FIG. 16 is a diagrammatic illustration of a layered coding scheme that shows three additional video coding schemes, for the enhancement macroblock, each using a bidirectional prediction frame, and that are used to improve coding efficiency.

The Wu et al. publications described the fundamental ideas about macroblock-based PFGS, and provided a simple method to choose the coding mode of each enhancement macroblock. However, only the case of the P frame was discussed, and five (5) video coding modes were given as examples for proposed P frame coding. An extension of this technique, possibly acceptable to the MPEG-4 standard, will now be discussed. This extension is directed to some new coding modes for the bi-directional or B frame case (temporal scalability case), and also to the spatial scalability case. The discussion is first directed to the B frame case in reference to FIG. 16 that illustrates the coding mode for the enhancement macroblock in the B frame. The convention for the meaning of the arrows and arrowheads seen in FIG. 16 are in accordance to the previously described figures.

The B frame has two unique characteristics that differ from the P frame. Firstly, the B frame does not cause drifting errors because it is never used as reference for frame predictions. Secondly, motion compensation can be performed from a bi-direction prediction. Three major modes that are often used in the B frame are given in FIG. 16. In the mode 1 of FIG. 16, all layers are predicted and reconstructed from the low quality references. In the mode 2 of FIG. 16, the base layer is predicted and reconstructed from the low quality references, and the enhancement layer is predicted and reconstructed from the high quality references. In the mode 3 of FIG. 16, all layers are predicted and reconstructed from the high quality references. Since there is no drifting error in the B frame, the drifting reduction technique is not necessary. At the same time, the traditional four (4) predicted directions in the B frame are still supported in the PFGS scheme, which are forward coding, backward coding, bidirectional coding, and direct coding. As such, the above two options provide twelve modes to the B frame coding.

The discussion is next directed to the spatial scalability case in reference to FIG. 17 which illustrates the coding mode for the enhancement macroblock in the P frame in the spatial scalability case. The convention for the meaning of the arrows and arrowheads are in accordance to the previously described and lower numbered figures. Additionally, the small boxes denote low resolution video. In the spatial scalability illustration seen in FIG. 17, there are two different resolutions among layers in one frame. In general, the base layer video is of low resolution. Zero or several low enhancement layers may be of low resolution dependent on the sequence content and the bit rate of base layer. The higher enhancement layers are of high resolution. Seven (7) proposed video coding modes for the P frame in the spatial scalability are given in FIG. 17. In Mode 1, all layers are predicted and reconstructed from low quality reference. In Mode 2, the low resolution layers are predicted and reconstructed from low quality reference and the high resolution layers are predicted and reconstructed from high quality reference. Mode 3 is the same as Mode 2 except the high quality reference is reconstructed from the low quality reference. Compared with Mode 2 and Mode 3, Mode 4 and Mode 5 have no DCT prediction between low resolution layers and high resolution layers. In Mode 6, all layers are predicted from the high quality reference. However, the low quality reference is reconstructed from the low quality reference. In Mode 7, all layers are predicted and reconstructed from the high quality reference.

Figure 18:
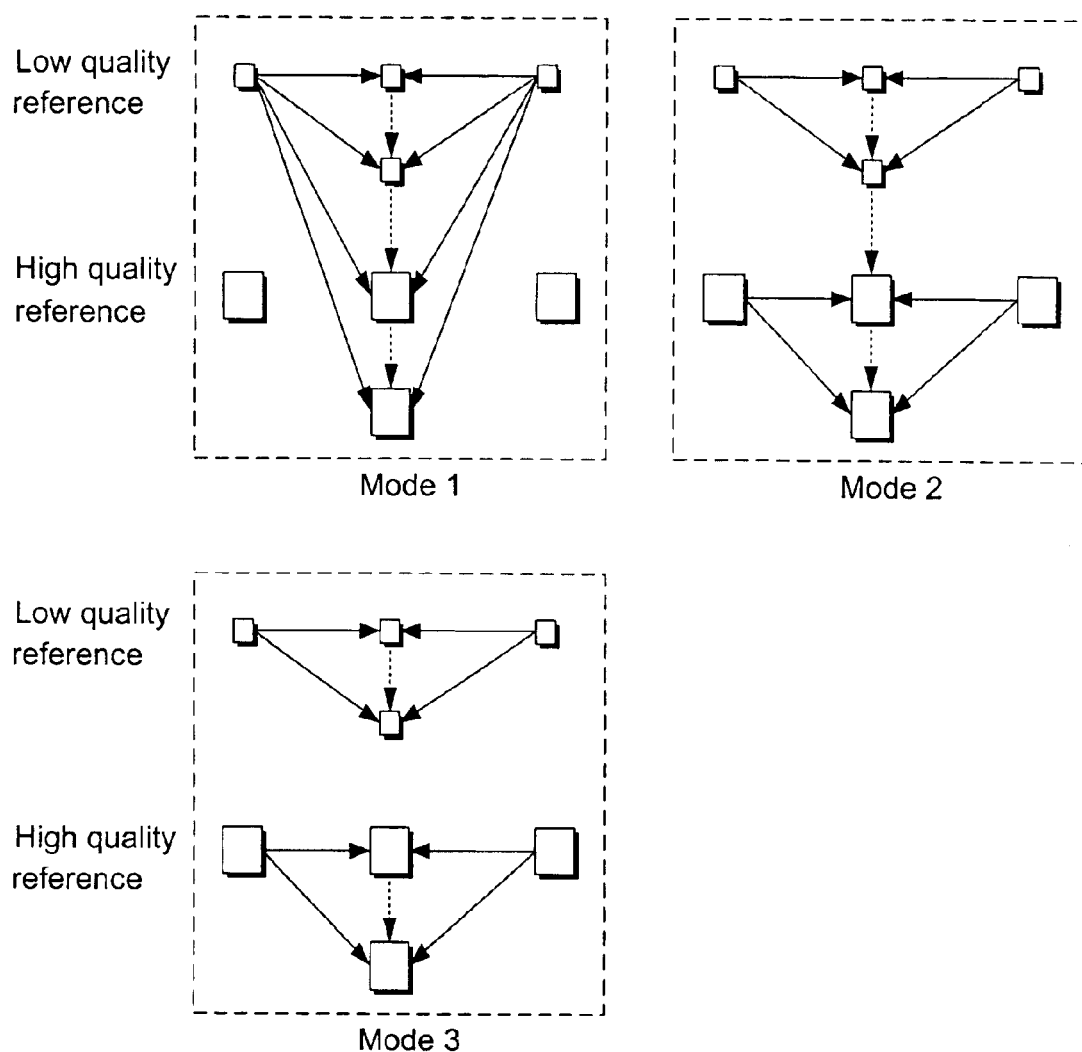
FIG. 18 is a diagrammatic illustration of a layered coding scheme that shows three additional video coding schemes for the enhancement macroblock, for the bidirectional prediction frame in spatial scalability, and that are used to reduce drifting error and improve coding efficiency.

The coding modes for the bidirectional or B frame in the spatial scalability are proposed in FIG. 18, wherein the convention for the meaning of the arrows and arrowheads seen in FIG. 18 are in accordance to the previously described and lower numbered figures. In the Mode 1, all layers are predicted and reconstructed from the low quality reference. In the Mode 2, the low resolution layers are predicted and reconstructed from the low quality reference and the high resolution layers are predicted and reconstructed from the high quality reference. Compared with Mode 2, Mode 3 has no DCT prediction between low resolution and high resolution.

Experimental Results and Conclusion

The experimental results have indicated that there can be a dramatic reduction in the drifting errors at the low enhancement bit rates. Moreover, the quality losses caused by the drifting errors can be optionally controlled dependent on the practical requirements. When the enhancement bit rate becomes moderate or high, the PFGS scheme can significantly improve the coding efficiency up to 1.8 dB compared with the FGS scheme specified in the MPEG-4 standard. The coding efficiency gap between the PFGS scheme and non-scalable video coding is closing to 1.0 dB at moderate or high enhancement bit rates.

For purposes of the explanation, specific numbers, materials and configurations are set forth above in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, and thereby better explain the present invention. Furthermore, for ease of understanding, certain method operations are delineated as separate operations; however, these separately delineated operations should not be construed as necessarily order dependent in their performance.

The inventors intend these exemplary implementations to be examples and not to limit the scope of the present invention. Rather, the inventors have contemplated that the present invention might also be embodied and implemented in other ways, in conjunction with other present or future technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for coding video data according to layered coding techniques in which the video data is represented as multi-layered frames, each frame having a plurality of references in multiple layers ranging from a base layer of low quality to enhancement layers of increasingly higher quality, the method comprising:

encoding macroblocks of the video data to produce a first bitstream representing a base layer;

selecting a coding mode for each macroblock, the coding mode being selected from a group comprising at least three coding modes where each coding mode specifies a prediction reference and a reconstruction reference, the prediction reference determining a predicted macroblock for a current frame and the reconstruction reference determining a reference for a next frame;

encoding each macroblock of the video data using the coding mode selected for the macroblock, the encoding of the macroblocks producing a second bitstream representing one or more enhancement layers the group of at least three coding modes comprising:

an LPLR coding mode that specifies the prediction reference as a low quality reference in a previous frame and the reconstruction reference as the low quality reference in the previous frame;

an HPHR coding mode that specifies the prediction reference as a high quality reference in a previous frame and the reconstruction reference as the high quality reference in the previous frame; and an HPLR coding mode that specifies the prediction reference as a high quality reference in a previous frame and the reconstruction reference as a low quality reference in the previous frame, wherein the high quality reference in the previous frame is not the same as the low quality reference in the previous frame, wherein at least two of the coding modes are utilized to produce the second bitstream.

2. The method as set forth in claim 1, wherein:

encoding macroblocks to produce the first and second bitstreams further comprises estimating drifting information that occurs from the encoding; and the coding mode is selected from the group based upon a derivation that uses the estimated drifting information to maximize coding efficiency while minimizing drifting error.

3. The method as set forth in claim 1, wherein:
encoding macroblocks to produce the first bitstream representing the base layer comprises motion compensating an original image using the base layer as a reference to form a low quality predicted image in the pixel domain $x_b$;
encoding macroblocks to produce the second bitstream representing one or more enhancement layers using one of the coding modes further comprises motion compensating an original image using the enhancement layer as a reference to form a high quality predicted image in the pixel domain $x_e$;
transforming the low quality predicted image in the pixel domain $x_b$ to form low quality predicted coefficients $X_b$;
quantizing the low quality predicted coefficients to form quantized coefficients; dequantizing the quantized coefficients to form dequantized coefficients $\tilde{X}_b$;
inverse transforming the dequantized coefficients $\tilde{X}_b$ to form inverse dequantized coefficients as a reconstructed base layer in pixel the domain $\tilde{x}_b$;
taking the absolute value of the difference between $\tilde{x}_b$ and:
the base layer of the motion compensated original image in the pixel domain $x_b$ to form a first value; and
the high quality predicted image in the pixel domain $x_e$ to form a second value;
selecting the LPLR mode when the first value less than or equal to the second value; and
selecting the HPLR mode or the HPHR mode when the first value greater then the second value.

4. A method as recited in claim 1, further comprising:
using variable length coding to compress the first and second bitstreams;
transmitting the compressed first and second bitstreams over a network;
decompressing and decoding the first bitstream representing the base layer into the video data; and
decompressing and decoding the second bitstream representing one or more enhancement layers into the video data.

5. A method as recited in claim 4, further comprising reconstructing a missing enhancement layer from one of the high and low high quality references in the previous frame.

6. The method as defined in claim 1, wherein the layered coding techniques comprise a Progressive Fine Granularity Scalable (PFGS) video coding.

7. A method for coding video data according to layered coding techniques in which the video data is represented as multi-layered frames, each frame having a plurality of references in multiple layers ranging from a base layer of low quality to enhancement layers of increasingly higher quality, the method comprising:
motion compensating an original image using the base layer as a reference to form a low quality predicted image;
transforming the low quality predicted image to form low quality predicted coefficients;
quantizing the low quality predicted coefficients to form quantized coefficients;
dequantizing the quantized coefficients to form dequantized coefficients;
inverse transforming the dequantized coefficients to form inverse dequantized coefficients in the form of a reconstructed base layer in pixel the domain $\tilde{x}_b$;
taking the absolute value of the difference between $\tilde{x}_b$ and:
the base layer of the motion compensated original image in the pixel domain $x_b$ to form a first value; and
one said enhancement layer of the motion compensated original image in the pixel domain $x_e$ to form a second value;
selecting the LPLR mode when the first value less than or equal to the second value; and
selecting the HPLR mode or the HPHR mode when the first value greater then the second value.

8. The method as defined in claim 7, wherein the layered coding techniques comprise a Progressive Fine Granularity Scalable (PFGS) video coding.

9. A computer-readable medium having computer-executable instructions, which when executed on a processor, direct a computer to perform the method of claim 7.

10. A computer-readable medium having computer-executable instructions, which when executed on a processor, direct a computer to:
encode macroblocks of video data according to layered coding techniques in which the macroblock video data is represented as multi-layered frames, each frame having a plurality of references in multiple layers ranging from a base layer of low quality to enhancement layers of increasingly higher quality, including encoding macroblocks to produce a first bitstream representing a base layer, and encoding macroblocks to produce a second bitstream representing one or more enhancement layers using coding mode selected from a group comprising at least three coding modes, the group including:
an LPLR coding mode that encodes macroblocks to produce the second bitstream by a prediction from a low quality reference in a previous frame, wherein a high quality reference of the current frame is reconstructed from the low quality reference in the previous frame;
an HPHR coding mode that encodes macroblocks to produce the second bitstream by a prediction from a high quality reference in a previous frame, wherein the high quality reference in the previous frame is used to reconstruct a high quality reference in the current frame; and
an HPLR coding mode that encodes macroblocks to produce the second bitstream by a prediction from a high quality reference in a previous frame, wherein:
a high quality reference of the current frame is reconstructed from a low quality reference in the previous frame; and
the high quality reference in the previous frame is not the same as the low quality reference in the previous frame.

11. A computer-readable medium as recited in claim 10, further having instructions that direct a computer to store the base layer and the one or more enhancement layers in memory.

12. A computer-readable medium as recited in claim 10, further having instructions that direct a computer to:
transmit the base layer over a network; and
transmit the one or more enhancement layers over the network according to bandwidth availability on the network.

13. A computer-readable medium as recited in claim 10, further having instructions that direct a computer to recover the video data from the base layer and any of the one or more enhancement layers.

14. A computer-readable medium as recited in claim 10, further having instructions that direct a computer to reconstruct a missing enhancement layer from an enhancement layer of a reference reconstructed frame.

15. A video coding system to encode video data according to layered coding techniques in which the video data is represented as multi-layered frames, each frame having a plurality of references in multiple layers ranging from a base layer of low quality to enhancement layers of increasingly higher quality, the video coding system comprising:
   a base layer encoder to encode macroblocks of the video data to produce a first bitstream representing a base layer; and
   an enhancement layer encoder to encode macroblocks of the video data to produce a second bitstream representing one or more enhancement layers using an INTER coding mode selected from a group comprising at least three coding modes, the group including:
      an LPLR coding mode that encodes macroblocks to produce the second bitstream by a prediction from a low quality reference in a previous frame, wherein a high quality reference of the current frame is reconstructed from the low quality reference in the previous frame;
      an HPHR coding mode that encodes macroblocks to produce the second bitstream by a prediction from a high quality reference in a previous frame, wherein the high quality reference in the previous frame is used to reconstruct a high quality reference in the current frame; and
      an HPLR coding mode that encodes macroblocks to produce the second bitstream by a prediction from a high quality reference in a previous frame, wherein:
         a high quality reference of the current frame is reconstructed from a low quality reference in the previous frame; and
         the high quality reference in the previous frame is not the same as the low quality reference in the previous frame.

16. An operating system comprising the video coding system of claim 15.

17. A video coding system for encoding video data according to layered coding techniques in which the video data is represented as multi-layered frames, each frame having a plurality of references in multiple layers ranging from a base layer of low quality to enhancement layers of increasingly higher quality, the video coding system comprising:
   means for encoding macroblocks of the video data to produce a first bitstream representing a base layer; and
   means for encoding macroblocks of the video data to produce a second bitstream representing one or more enhancement layers using an INTER coding mode selected from a group including:
      an LPLR coding mode that encodes macroblocks to produce the second bitstream by a prediction from a low quality reference in a previous frame, wherein a high quality reference of the current frame is reconstructed from the low quality reference in the previous frame;
      an HPHR coding mode that encodes macroblocks to produce the second bitstream by a prediction from a high quality reference in a previous frame, wherein the high quality reference in the previous frame is used to reconstruct a high quality reference in the current frame; and
      an HPLR coding mode that encodes macroblocks to produce the second bitstream by a prediction from a high quality reference in a previous frame, wherein:
         a high quality reference of the current frame is reconstructed from a low quality reference in the previous frame; and
         the high quality reference in the previous frame is not the same as the low quality reference in the previous frame.

18. An operating system comprising the video coding system of claim 17.

19. A video delivery architecture, comprising:
   a content provider having a video storage to store video data, a video server to serve the video data over a network, a base layer encoder, and an enhancement layer encoder, the video server being configured to encode macroblocks of video data according to layered coding techniques in which the macroblock video data is represented as multi-layered frames, each frame having a plurality of references in multiple layers ranging from a base layer of low quality to enhancement layers of increasingly higher quality, wherein:
      the base layer encoder encodes macroblocks to produce a first bitstream representing a base layer; and
      the enhancement layer encoder encodes macroblocks to produce a second bitstream representing one or more enhancement layers using an INTER coding mode selected from a group comprising at least three coding modes, the group including:
         an LPLR coding mode that encodes macroblocks to produce the second bitstream by a prediction from a low quality reference in a previous frame, wherein a high quality reference of the current frame is reconstructed from the low quality reference in the previous frame;
         an HPHR coding mode that encodes macroblocks to produce the second bitstream by a prediction from a high quality reference in a previous frame, wherein the high quality reference in the previous frame is used to reconstruct a high quality reference in the current frame; and
         an HPLR coding mode that encodes macroblocks to produce the second bitstream by a prediction from a high quality reference in a previous frame, wherein:
            a high quality reference of the current frame is reconstructed from a low quality reference in the previous frame; and
            the high quality reference in the previous frame is not the same as the low quality reference in the previous frame;
   a client configured to receive the encoded video data served from the content provider, the client being configured to decode the video data.

20. A video delivery architecture as recited in claim 19, wherein:
   the video server transmits the encoded video data as composing the base layer and the one or more of the enhancement layers; and
   the client decodes the video data from the base layer and the one or more enhancement layers.

21. A video delivery architecture as recited in claim 19, wherein the client reconstructs an enhancement layer in a particular frame from an enhancement layer of a reference reconstructed frame.

22. A method for coding video data according to layered coding techniques in which the video data is represented as multi-layered frames, each frame having a plurality of references in multiple layers ranging from a base layer of low quality to enhancement layers of increasingly higher quality, the method comprising:

encoding macroblocks of the video data to produce a first bitstream representing a base layer;

encoding macroblocks of the video data to produce a second bitstream representing one or more enhancement layers using an INTER coding mode selected from a group including:

a BHPLR coding mode that encodes macroblocks to produce the second bitstream by a prediction from a high quality reference in a previous frame, wherein:
a low quality reference of the current frame is reconstructed from, and is of the same quality as, a low quality reference in the previous frame; and
a high quality reference of the current frame is reconstructed from, and is of the same quality as, the high quality reference in the previous frame;

a BHPHR coding mode that encodes macroblocks to produce the second bitstream by a prediction from a high quality reference in a previous frame, wherein:
a low quality reference of the current frame is reconstructed from the high quality reference in the previous frame; and
a high quality reference of the current frame is reconstructed from, and is of the same quality as, the high quality reference in the previous frame.

23. A computer-readable medium having computer-executable instructions, which when executed on a processor, direct a computer to perform the method of claim 22.

24. The method as defined in claim 22, wherein the layered coding techniques comprise a Progressive Fine Granularity Scalable (PFGS) video coding.

25. A video delivery architecture, comprising:
a content provider having a video storage to store video data, a video server to serve the video data over a network, a base layer encoder, and an enhancement layer encoder, the video server being configured to encode macroblocks of video data according to layered coding techniques in which the macroblock video data is represented as multi-layered frames, each frame having a plurality of references in multiple layers ranging from a base layer of low quality to enhancement layers of increasingly higher quality, wherein:
the base layer encoder encodes macroblocks to produce a first bitstream representing a base layer; and
the enhancement layer encoder encodes macroblocks to produce a second bitstream representing one or more enhancement layers using an INTER coding mode selected from a group including:
a BHPLR coding mode that encodes macroblocks to produce the second bitstream by a prediction from a high quality reference in a previous frame, wherein:
a low quality reference of the current frame is reconstructed from, and is of the same quality as, a low quality reference in the previous frame; and
a high quality reference of the current frame is reconstructed from, and is of the same quality as, the high quality reference in the previous frame;
a BHPHR coding mode that encodes macroblocks to produce the second bitstream by a prediction from a high quality reference in a previous frame, wherein:
a low quality reference of the current frame is reconstructed from the high quality reference in the previous frame; and
a high quality reference of the current frame is reconstructed from, and is of the same quality as, the high quality reference in the previous frame;
a client configured to receive the encoded video data served from the content provider, the client being configured to decode the video data.

26. A video delivery architecture as recited in claim 25, wherein:
the video server transmits the encoded video data as composing the base layer and the one or more of the enhancement layers; and
the client decodes the video data from the base layer and the one or more enhancement layers.

27. A video delivery architecture as recited in claim 25, wherein the client reconstructs an enhancement layer in a particular frame from an enhancement layer of a reference reconstructed frame.

28. A method for coding video data according to layered coding techniques in which the video data is represented as multi-layered frames in multiple layers ranging from a base layer of low quality to enhancement layers of increasingly higher quality, the frames including frames n−1, n, and n+1, wherein frames n−1 and n+1 have a plurality of references, the method comprising:

encoding macroblocks of the video data to produce a first bitstream representing a base layer;

encoding macroblocks of the video data to produce a second bitstream representing one or more enhancement layers using an INTER coding mode selected from a group including:
a first coding mode that encodes macroblocks to produce the second bitstream for the n frame by temporal predictions from both a low quality reference in the n−1 frame and a low quality reference in the n+1 frame;
a second coding mode that encodes macroblocks to produce the second bitstream for the n frame by temporal predictions from:
a low quality reference in the n−1 frame;
a low quality reference in the n+1 frame;
a high quality reference in the n−1 frame; and
a high quality reference in the n+1 frame;
wherein the low quality references in the n−1 and n+1 frames are used to predict only the lowest quality enhancement layer in the n frame;
a third coding mode that encodes macroblocks to produce the second bitstream for the n frame by temporal predictions from:
a high quality reference in the n−1 frame; and
a high quality reference in the n+1 frame.

29. A computer-readable medium having computer-executable instructions, which when executed on a processor, direct a computer to perform the method of claim 28.

30. The method as defined in claim 28, wherein the layered coding techniques comprise a Progressive Fine Granularity Scalable (PFGS) video coding.

31. A video delivery architecture, comprising:
a content provider having a video storage to store video data, a video server to serve the video data over a network, a base layer encoder, and an enhancement layer encoder, the video server being configured to encode macroblocks of video data according to layered coding techniques in which the macroblock video data is represented as multi-layered frames, each frame having a plurality of references in multiple layers ranging from a base layer of low quality to enhancement layers of increasingly higher quality, the frames including frames n−1, n, and n+1, wherein frames n−1 and n+1 have a plurality of references, wherein:

the base layer encoder encodes macroblocks to produce a first bitstream representing a base layer; and the enhancement layer encoder encodes macroblocks to produce a second bitstream representing one or more enhancement layers using an INTER coding mode selected from a group including:

a first coding mode that encodes macroblocks to produce the second bitstream for the n frame by temporal predictions from both a low quality reference in the n−1 frame and a low quality reference in the n+1 frame;

a second coding mode that encodes macroblocks to produce the second bitstream for the n frame by temporal predictions from:
a low quality reference in the n−1 frame;
a low quality reference in the n+1 frame;
a high quality reference in the n−1 frame; and
a high quality reference in the n+1 frame;
wherein the low quality references in the n−1 and n+1 frames are used to predict only the lowest quality enhancement layer in the n frame;

a third coding mode that encodes macroblocks to produce the second bitstream for the n frame by temporal predictions from:
a high quality reference in the n−1 frame; and
a high quality reference in the n+1 frame;

a client configured to receive the encoded video data served from the content provider, the client being configured to decode the video data.

32. A video delivery architecture as recited in claim 31, wherein:
the video server transmits the encoded video data as composing the base layer and the one or more of the enhancement layers; and
the client decodes the video data from the base layer and the one or more enhancement layers.

33. A video delivery architecture as recited in claim 31, wherein the client reconstructs an enhancement layer in a particular frame from an enhancement layer of a reference reconstructed frame.

34. A method for coding video data according to layered coding techniques in which the video data is represented as multi-layered frames, each frame having a plurality of references in multiple layers ranging from a base layer of low quality to enhancement layers of increasingly higher quality, the method comprising:

encoding macroblocks of the video data to produce a first bitstream representing a base layer;

encoding macroblocks of the video data to produce a second bitstream representing a plurality of high resolution enhancement layers and a plurality of low resolution enhancement layers using an INTER coding mode selected from a group including:

a first coding mode that encodes macroblocks to produce the second bitstream having high and low resolution components in a current frame, wherein:
both the low and high resolution components are predicted in the temporal domain from a low quality, low resolution reference in a previous frame; and a high resolution, high quality reference in the current frame is reconstructed from the low quality, low resolution reference in the previous frame;

a second coding mode that encodes macroblocks to produce the second bitstream having high and low resolution components in a current frame, wherein:
the low resolution components are predicted in the temporal domain from a low quality, low resolution reference in a previous frame;
the high resolution components are predicted in the temporal domain from a high quality, high resolution reference of the previous frame; and
a high resolution, high quality reference in the current frame is reconstructed from, and is of the same quality as, the high quality, high resolution reference in the previous frame;

a third coding mode that encodes macroblocks to produce the second bitstream having high and low resolution components in a current frame, wherein:
one said low resolution enhancement layer predicts another said low resolution enhancement layer of higher quality in the transform domain;
one said high resolution enhancement layer predicts another said high resolution enhancement layer of higher quality in the transform domain;
one said low resolution enhancement layer predicts in the transform domain one said high resolution enhancement layer;
a high resolution, high quality reference in the current frame is reconstructed from the low quality, low resolution reference in the previous frame;

a fourth coding mode that encodes macroblocks to produce the second bitstream having high and low resolution components in a current frame, wherein:
the one or more enhancement layers include a plurality of high resolution enhancement layers and a plurality of low resolution enhancement layers;
one said low resolution enhancement layer predicts another said low resolution enhancement layer of higher quality in the transform domain;
one said high resolution enhancement layer predicts another said high resolution enhancement layer of higher quality in the transform domain;
the high resolution enhancement layers are not predicted in the transform domain from the low resolution enhancement layers;
the low resolution components are predicted in the temporal domain from a low quality, low resolution reference in a previous frame;
the high resolution components are predicted in the temporal domain from a high quality, high resolution reference of the previous frame; and
a high resolution, high quality reference in the current frame is reconstructed from, and is of the same quality as, the high quality, high resolution reference in the previous frame;

a fifth coding mode that encodes macroblocks to produce the second bitstream having high and low resolution components in a current frame, wherein:
the one or more enhancement layers include a plurality of high resolution enhancement layers and a plurality of low resolution enhancement layers;
one said low resolution enhancement layer predicts another said low resolution enhancement layer of higher quality in the transform domain;
one said high resolution enhancement layer predicts another said high resolution enhancement layer of higher quality in the transform domain;

the high resolution enhancement layers are not predicted in the transform domain from the low resolution enhancement layers;

the low resolution components are predicted in the temporal domain from a low quality, low resolution reference in a previous frame;

the high resolution components are predicted in the temporal domain from a high quality, high resolution reference of the previous frame; and a high resolution, high quality reference in a current frame is reconstructed from the low quality, low resolution reference in the previous frame;

a sixth coding mode that encodes macroblocks to produce the second bitstream having high and low resolution components in a current frame, wherein:

both of the low and high resolution components are predicted in the temporal domain in the temporal domain from a high quality, high resolution reference in a previous frame; and a low resolution, low quality reference in the current frame is reconstructed from a low quality, low resolution reference in the previous frame;

a seventh coding mode that encodes macroblocks to produce the second bitstream having high and low resolution components in a current frame, wherein:

both of the low and high resolution components are predicted in the temporal domain from a high quality, high resolution reference in a previous frame; and a high resolution, high quality reference in the current frame is reconstructed from the high quality, high resolution reference in the previous frame.

35. A computer-readable medium having computer-executable instructions, which when executed on a processor, direct a computer to perform the method of claim 34.

36. The method as defined in claim 34, wherein the layered coding techniques comprise a Progressive Fine Granularity Scalable (PFGS) video coding.

37. A method for coding video data according to layered coding techniques in which the video data is represented as multi-layered frames in multiple layers ranging from a base layer of low quality to enhancement layers of increasingly higher quality, the frames including frames n−1, n, and n+1, wherein frames n−1 and n+1 have a plurality of references, the method comprising:

encoding macroblocks of the video data to produce a first bitstream representing a base layer;

encoding macroblocks of the video data to produce a second bitstream representing a plurality of high resolution enhancement layers and a plurality of low resolution enhancement layers using an INTER coding mode selected from a group including:

a first coding mode that encodes macroblocks to produce the second bitstream having high and low resolution components in the n frame, wherein both the low and high resolution components in the n frame are predicted in the temporal domain from a low quality, low resolution reference in each of the n−1 and n+1 frames;

a second coding mode that encodes macroblocks to produce the second bitstream having high and low resolution components for the n frame by temporal predictions from:

a low quality, low resolution reference in each of the n−1 and n+1 frames to produce low quality, low resolution components in n frame; and a high quality, high resolution reference in each of the n−1 and n+1 frames to produce high quality, high resolution components in n frame;

wherein one said low resolution, low quality component in the n frame is used for prediction in the transform domain of one said high quality, high resolution component in n frame;

a third coding mode that encodes macroblocks to produce the second bitstream having high and low resolution components for the n frame by temporal predictions from:

a low quality, low resolution reference in each of the n−1 and n+1 frames to produce low quality, low resolution components in n frame; and a high quality, high resolution reference in each of the n−1 and n+1 frames to produce high quality, high resolution components in n frame;

wherein the low resolution, low quality components in the n frame are not used for prediction in the transform domain of the high quality, high resolution components in n frame.

38. A computer-readable medium having computer-executable instructions, which when executed on a processor, direct a computer to perform the method of claim 37.

39. The method as defined in claim 37, wherein the layered coding techniques comprise a Progressive Fine Granularity Scalable (PFGS) video coding.

40. A video delivery architecture, comprising:

a content provider having a video storage to store video data, a video server to serve the video data over a network, a base layer encoder, and an enhancement layer encoder, the video server being configured to encode macroblocks of video data according to layered coding techniques in which the macroblock video data is represented as multi-layered frames, each frame having a plurality of references in multiple layers ranging from a base layer of low quality to enhancement layers of increasingly higher quality, the frames including frames n−1, n, and n+1, wherein frames n−1 and n+1 have a plurality of references, wherein:

the base layer encoder encodes macroblocks to produce a first bitstream representing a base layer; and the enhancement layer encoder encodes macroblocks to produce a second bitstream representing a plurality of high resolution enhancement layers and a plurality of low resolution enhancement layers using an INTER coding mode selected from the group consisting of:

a first coding mode that encodes macroblocks to produce the second bitstream having high and low resolution components in the n frame, wherein both the low and high resolution components in the n frame are predicted in the temporal domain from a low quality, low resolution reference in each of the n−1 and n+1 frames;

a second coding mode that encodes macroblocks to produce the second bitstream having high and low resolution components for the n frame by temporal predictions from:

a low quality, low resolution reference in each of the n−1 and n+1 frames to produce low quality, low resolution components in n frame; and a high quality, high resolution reference in each of the n−1 and n+1 frames to produce high quality, high resolution components in n frame;

wherein one said low resolution, low quality component in the n frame is used for prediction in the transform domain of one said high quality, high resolution component in n frame;

a third coding mode that encodes macroblocks to produce the second bitstream having high and low resolution components for the n frame by temporal predictions from:
  a low quality, low resolution reference in each of the n−1 and n+1 frames to produce low quality, low resolution components in n frame; and
  a high quality, high resolution reference in each of the n−1 and n+1 frames to produce high quality, high resolution components in n frame;
wherein the low resolution, low quality components in the n frame are not used for prediction in the transform domain of the high quality, high resolution components in n frame;

a client configured to receive the encoded video data served from the content provider, the client being configured to decode the video data.

41. A video delivery architecture as recited in claim 40, wherein:
the video server transmits the encoded video data as composing the base layer and the one or more of the enhancement layers; and
the client decodes the video data from the base layer and the one or more enhancement layers.

42. A video delivery architecture as recited in claim 40, wherein the client reconstructs an enhancement layer in a particular frame from an enhancement layer of a reference reconstructed frame.

43. A method for reducing drifting errors in a video encoding scheme where video data is represented as multi-layered frames, each frame having a plurality of references in multiple layers ranging from a base layer of a low quality to enhancement layers of increasingly higher quality, the method comprising:
selectively choosing a coding mode from a plurality of coding modes for each macroblock in the video data, the plurality of coding modes differing with respect to references used for prediction and reconstruction; and
encoding each macroblock in the enhancement layers with the chosen coding mode.

44. The method of claim 43, wherein at least one of the coding modes uses a different reference for prediction and for reconstruction.

45. The method of claim 43, wherein the plurality of coding modes comprise at least three INTER coding modes.

46. The method of claim 45, wherein one of the INTER coding modes comprises a LPLR mode in which the macroblock is predicted from a previous low quality reference and a high quality reference for a next frame is reconstructed from the same reference.

47. The method of claim 45, wherein one of the INTER coding modes comprises an HPHR mode in which the macroblock is predicted from a previous high quality reference and reconstructed from the same reference.

48. The method of claim 45, wherein one of the INTER coding modes comprises an HPLR mode in which the macroblock is predicted from a previous high quality reference and the high quality reference is reconstructed from a previous low quality reference.

49. The method of claim 43, wherein the coding mode is selected based on an iterative drifting model that controls the drifting error in the coding scheme.

50. The method of claim 43, wherein the coding mode is selected based on an temporal prediction of each frame.

51. The method of claim 43, wherein each coding mode is utilized for at least one of the macroblocks in the video data.

52. The method of claim 43, wherein at least two of the plurality of coding modes are utilized when encoding the macroblocks in the enhancement layers.

53. The method of claim 43, wherein the video encoding scheme comprises a progressive fine granularity scalable (PFGS) video encoding.

* * * * *